(12) United States Patent
Goldsche et al.

(10) Patent No.: US 12,366,300 B2
(45) Date of Patent: Jul. 22, 2025

(54) PRESSURE EQUALIZATION APPARATUS AND ELECTROCHEMICAL SYSTEM

(71) Applicant: ElringKlinger AG, Dettingen (DE)

(72) Inventors: Matthias Goldsche, Neuffen (DE); Axel Streicher, Metzingen (DE)

(73) Assignee: ElringKlinger AG, Dettingen (DE)

( * ) Notice: Subject to any disclaimer, the term of this patent is extended or adjusted under 35 U.S.C. 154(b) by 126 days.

(21) Appl. No.: 18/161,043

(22) Filed: Jan. 28, 2023

(65) Prior Publication Data
US 2023/0175602 A1  Jun. 8, 2023

Related U.S. Application Data

(63) Continuation of application No. PCT/EP2021/072481, filed on Aug. 12, 2021.

(30) Foreign Application Priority Data

Aug. 14, 2020 (DE) ..................... 10 2020 210 388.7

(51) Int. Cl.
F16K 17/04   (2006.01)
F16K 24/04   (2006.01)
H01M 50/333  (2021.01)

(52) U.S. Cl.
CPC .......... F16K 17/0413 (2013.01); F16K 24/04 (2013.01); H01M 50/333 (2021.01); H01M 2220/20 (2013.01)

(58) Field of Classification Search
CPC ............... F16K 17/025; F16K 17/0413; F16K 17/044; F16K 17/0493; F16K 24/04; F16K 24/06; F16K 15/064; F16K 15/065; F16K 15/067; H01M 50/33
See application file for complete search history.

(56) References Cited

U.S. PATENT DOCUMENTS

| 2013/0032219 A1 | 2/2013 | Heim et al. |
| 2018/0219200 A1 | 8/2018 | Albukrek et al. |
| 2019/0128438 A1* | 5/2019 | Mallikarjunaiah ..... F16K 24/04 |
| 2021/0320375 A1 | 10/2021 | Zbiral et al. |

(Continued)

FOREIGN PATENT DOCUMENTS

| DE | 10 2011 080 325 A1 | 2/2013 |
| DE | 10 2015 214 256 A1 | 2/2017 |

(Continued)

Primary Examiner — Hailey K. Do
(74) Attorney, Agent, or Firm — ASLAN LAW, P.C.

(57) ABSTRACT

A pressure equalization apparatus comprises a main element, a sealing device, and a connection device for connecting the main element and the sealing device. The sealing device sealingly bears against the main element when the pressure equalization apparatus is in a closed state and is fixed relative to the main element via the connection device. A fixing connection between the main element and the sealing device which is formed thereby can be released in order to unblock a fluid connection between the interior of the pressure equalization apparatus and surroundings of the pressure equalization apparatus. The connection device comprises a spring element, the spring force of which acts in particular in a direction extending crosswise to an opening direction of the pressure equalization apparatus.

18 Claims, 19 Drawing Sheets

(56) References Cited

U.S. PATENT DOCUMENTS

| | | | |
|---|---|---|---|
| 2023/0198086 A1* | 6/2023 | Raettich | F16K 17/025 |
| | | | 429/54 |
| 2023/0235824 A1* | 7/2023 | Di Monte | F16K 39/04 |
| | | | 137/315.33 |

FOREIGN PATENT DOCUMENTS

| | | |
|---|---|---|
| DE | 10 2019 100 094 A1 | 7/2020 |
| DE | 10 2019 204 859 A1 | 10/2020 |

* cited by examiner

PRESSURE EQUALIZATION APPARATUS AND ELECTROCHEMICAL SYSTEM

RELATED APPLICATION

This application is a continuation of international application No. PCT/EP2021/072481 filed on Aug. 12, 2021 and claims the benefit of German application No. 10 2020 210 388.7 filed on Aug. 14, 2020, which are incorporated herein by reference in their entirety and for all purposes.

FIELD OF DISCLOSURE

The present invention relates to a pressure equalization apparatus—in particular, for equalizing an overpressure in an electrochemical system.

The present invention further relates to an electrochemical system comprising one or more pressure equalization apparatuses according to the invention.

BACKGROUND

Pressure equalization apparatuses are known from DE 10 2019 100 094 A1.

SUMMARY OF THE INVENTION

The object of the present invention is to provide a pressure equalization apparatus by means of which pressure equalization can be brought about in the event of an overpressure—in particular, in an electrochemical system—and which can be produced as easily as possible.

The above-mentioned object is achieved by a pressure equalization apparatus according to claim 1.

The pressure equalization apparatus—in particular, for equalizing an overpressure in an electrochemical system—preferably comprises a main element and/or a sealing device which, in a closed state of the pressure equalization apparatus, closes an interior of the pressure equalization apparatus.

In particular, the pressure equalization apparatus comprises a connection device for connecting the main element and the sealing device.

It can be advantageous if, in the closed state of the pressure equalization apparatus, the sealing device sealingly bears against the main element and is fixed relative to the main element by means of the connection device, and if a fixing connection formed thereby between the main element and the sealing device is releasable for unblocking a fluid connection between the interior of the pressure equalization apparatus and surroundings of the pressure equalization apparatus.

The connection device preferably comprises a spring element, the spring force of which acts in particular in a direction extending crosswise to an opening direction of the pressure equalization apparatus.

In particular, the spring force acts in a direction extending at least approximately perpendicular to the opening direction of the pressure equalization apparatus.

Because the spring force of the spring element acts in a direction extending crosswise—in particular, at least approximately perpendicular—to the opening direction of the pressure equalization apparatus, an opening pressure, in particular, of the pressure equalization apparatus is adjustable.

The opening pressure is to be understood in particular as a critical pressure. In particular, the pressure equalization apparatus, when the opening pressure and/or the critical pressure is exceeded, goes from the closed state to the open state.

It may be favorable if the spring element is a shaped spring and/or a leaf spring.

A "shaped spring" is preferably understood to mean a specifically produced spring which is produced, for example, from a spring steel sheet and/or a spring steel strip. A shaped spring is in particular a flat spring and/or a leaf spring.

In electrochemical systems or individual electrochemical cells of an electrochemical system, there is the risk of what is referred to as a "thermal runaway," in the case of which, due to exothermic chemical reactions within electrochemical cells of an electrochemical system, or due to a short circuit, a self-reinforcing heat development and overheating of one or more electrochemical cells of an electrochemical system occurs. In the case of a "thermal runaway," there is frequently a dominant heat propagation from one electrochemical cell to another electrochemical cell within the electrochemical system.

A "thermal runaway" is what is referred to as a "thermal event." Thermal events are in particular accompanied by a strong pressure increase within the electrochemical cell and/or by high temperatures—for example, temperatures of 1,000° C. or more.

A pressure equalization between the interior of the pressure equalization apparatus, and preferably a container of an electrochemical system, and the surroundings of the pressure equalization apparatus can now be brought about by the pressure equalization apparatus. The container of the electrochemical system is, for example, a housing of the electrochemical system. As a result of the pressure equalization, harmful gases which have led to an overpressure of the container can be discharged.

"Pressure equalization" is preferably understood to mean an adjustment of the internal pressure in the interior of the pressure equalization apparatus to an external pressure in the surroundings of the pressure equalization apparatus—in particular, when a limit value, e.g., the opening pressure, is exceeded.

The pressure equalization apparatus is suitable in particular for use in vehicles—for example, in electrochemical systems in the form of battery accumulators of vehicles.

In particular, the safety of vehicle occupants is increased by the pressure equalization apparatus, since gases can be discharged in the event of an overpressure in a battery accumulator, and in particular an ignition of the battery accumulator can thus be prevented.

The opening direction of the pressure equalization apparatus is preferably a pressure equalization direction which extends from a region of higher pressure, e.g., the interior of the pressure equalization apparatus, to a region of lower pressure—for example, the surroundings of the pressure equalization apparatus.

Preferably, the pressure equalization apparatus is at least approximately circular in a cross-section taken perpendicularly to the opening direction.

Alternatively, the pressure equalization apparatus is formed so as to be at least approximately oval or rectangular in a cross-section taken perpendicularly to the opening direction.

In particular, a width and/or a diameter of an opening channel of the pressure equalization apparatus in a plane perpendicular to the opening direction is greater by a factor of three or more—in particular, by a factor of five or more—than an extension of the pressure equalization apparatus in a direction running parallel to the opening direction.

In particular, the pressure equalization apparatus has a cross-section large enough to prevent a rupture of the electrochemical system.

It may be favorable if the spring element comprises one or more retaining elements, e.g., one or more inwardly-protruding latching projections, which, in the closed state of the pressure equalization apparatus, engage behind and/or around part of the sealing device in the opening direction.

The one or more retaining elements are preferably retaining noses which engage and/or snap into holding recesses of the sealing device that are formed so as to be complementary to said noses.

It can be advantageous if the sealing device comprises a holding element which preferably has one or more holding elevations—for example, one or more holding noses. In particular, the one or more holding recesses of the sealing device are arranged adjacently to the one or more holding elevations, and/or are formed thereby.

For example, the holding element has a holding recess which is formed as a constriction adjacent to a holding elevation.

In embodiments in which the holding element has exactly one holding recess and/or exactly one holding elevation, these are preferably formed peripherally along a peripheral direction of the holding element.

Alternatively, it can be provided for several holding recesses and/or holding elevations to be provided—in particular, regularly—along the peripheral direction of the holding element.

It can be advantageous if the spring element is at least approximately U-shaped in a cross-section which is taken parallel to the opening direction. The spring element can thus engage around the holding element—in particular, on three sides.

Preferably, the spring element has two or more legs which, along the opening direction, extend away from a connection portion of the spring element.

It may be favorable if the one or more retaining elements of the spring element are arranged on the ends, facing away from the interior, of the two or more legs.

The connection device preferably comprises a receiving element which receives and/or holds the spring element—in particular, a connection portion, facing the interior, of the spring element.

It can be provided that the receiving element have a sealing portion which, in the closed state of the pressure equalization apparatus, sealingly bears against the main element—for example, is received in and/or by a central portion of the main element.

Additionally or alternatively, the receiving element has a counter holding portion which is arranged at a side, facing away from the interior, of the sealing portion of the receiving element and is spaced apart therefrom. The counter holding portion preferably engages behind the spring element in the closed state of the pressure equalization apparatus.

For example, the connection portion of the spring element is received and/or clamped between the sealing portion and the counter holding portion of the receiving element.

The receiving element forms, for example, a receiving shoe for the spring element.

It may be favorable if the receiving element has several, in particular punctiform or linear, contact regions, which are in direct contact with the spring element and preferably receive and/or support the spring element on both sides.

For example, the several contact regions are formed by bulges in the sealing portion and/or in the counter holding portion.

According to a preferred embodiment, the spring element bears against and/or on two contact regions of the sealing portion, on an end, facing the interior, of the spring element of the pressure equalization apparatus. Additionally or alternatively, the connection portion is pressed against the sealing portion of the receiving element by a contact region on a side, facing away from the interior, of the connection portion.

Preferably, the legs of the spring element are held at a distance from two further contact regions of the counter holding portion of the receiving element, and/or are pressed outwards.

It can be advantageous if a three-point mounting of the spring element is formed in a cross-section through the receiving element taken parallel to the opening direction.

The sealing device preferably comprises a support plate and a holding element, e.g., a pin, adjoining said plate, wherein the holding element preferably extends away from the support plate counter to the opening direction, and/or is held and/or surrounded by the spring element in the closed state of the pressure equalization apparatus—in particular, in such a way that the spring element engages around the holding element—in particular, on two sides.

The one or more retaining elements of the spring element preferably engage in one or more holding recesses of the holding element, and/or are latched thereto.

It can be advantageous if the one or more holding elevations of the holding element extend radially outwards from a main body of the holding element with respect to a central axis of the pressure equalization apparatus.

According to an alternative embodiment, it can be provided that the spring element open along a direction pointing towards the interior and, for example, for the main element to comprise a holding element which is fixed between legs of the spring element in the closed state of the pressure equalization apparatus. According to the alternative embodiment, the connection portion of the spring element is preferably fixed to the sealing device.

It may be favorable if one or more retaining elements of the spring element, in an open state of the pressure equalization apparatus, each form a stop with respect to a movement of the sealing device counter to the opening direction.

By setting a shape of the one or more retaining elements, an opening pressure, in particular, of the pressure equalization apparatus can be set.

For example, the opening pressure is adjusted by adjusting an angle which encloses inclined portions of the one or more retaining elements with the opening direction. In particular, a contact pressure of the spring element on the sealing device is adjustable using the angle. This can facilitate assembly of the pressure equalization apparatus.

The greater the angle, the smaller the opening pressure of the pressure equalization apparatus preferably is.

It may be favorable if, when the critical pressure, e.g., the opening pressure, is exceeded, the sealing device is pressed with a force in the opening direction, which force exceeds a spring force of the spring element, and, as a result, the one or more legs of the spring element are pressed in direction(s) extending crosswise with respect to the opening direction in such a way that a movement of the sealing device relative to the main element in the opening direction is unblocked. The pressure equalization apparatus thus enters an open state.

It can be provided that the connection device comprise at least one further spring element which, in the closed state of the pressure equalization apparatus, is held in a compressed position between the main element and the sealing device, and/or which is held in a relaxed position (rest position) in an open state of the pressure equalization apparatus.

The at least one further spring element is preferably a compression spring—for example, a spiral spring.

The at least one further spring element preferably serves for fine adjustment of the opening pressure of the pressure equalization apparatus—for example, in the range of ±100 mbar.

Preferably, the spring force of the at least one further spring element acts in a direction crosswise to the direction in which the spring force of the spring element acts.

It may be favorable if a ratio of a length of the spring element parallel to the opening direction to an average material thickness of the spring element is ca. 4:1 or more, and in particular ca. 10:1 or more—for example, ca. 20:1 or more.

In particular, the ratio of the length of the spring element parallel to the opening direction to the average material thickness of the spring element is ca. 100:1 or less, and in particular ca. 90:1 or less—for example, ca. 80:1 or less.

A ratio of a minimum width of the spring element perpendicular to the opening direction to the average material thickness of the spring element is preferably about 2:1 or more, and in particular about 5:1 or more—for example, about 10:1 or more.

Preferably, the ratio of the minimum width of the spring element perpendicular to the opening direction to the average material thickness of the spring element is about 50:1 or less, and in particular about 45:1 or less—for example, about 40:1 or less.

The minimum width of the spring element is preferably a spacing between two retaining elements in a direction extending perpendicular to the opening direction.

For example, the minimum width of the spring element can be a minimum diameter of the spring element.

By selecting the average material thickness and/or the length and/or the minimum width of the spring element, the opening pressure and/or the critical pressure is preferably adjustable.

It can be advantageous if the sealing device comprises a membrane—in particular, a porous membrane—a sealing element, and/or a sealing ring—in particular, connected to the sealing element and/or the membrane.

For optimized sealing, it can be provided that the sealing element have one or more sealing lips which bear against the main element and/or rest on the main element—in particular, at an end, facing away from the interior, of the main element.

The sealing element is preferably a shaped seal. In particular, the sealing element is firmly bonded to the support plate and/or the sealing ring of the sealing device—for example, by injection molding and/or vulcanization. A cost-effective production of the pressure equalization apparatus can thus take place.

Preferably, in the event of a differential pressure, the one or more sealing lips is/are supported on the main element and/or form a seal.

The membrane is fixed to the support plate and/or the sealing ring, for example, by adhesive bonding and/or welding and/or overmolding.

Additionally or alternatively, the membrane can be fixed to the support plate and/or the sealing ring in a firmly-bonded, force-fitting, and/or form-fitting manner—for example, by welding, gluing, and/or clamping. Furthermore, it can be provided that the membrane be arranged, and in particular fixed, on the support plate and/or on the sealing ring by injection molding and/or overmolding in an injection molding process.

The sealing device preferably comprises a support plate.

The membrane and/or a sealing element—in particular, a sealing lip—and/or a sealing ring for fixing the membrane and/or the sealing element are preferably arranged on the support plate, and in particular fixed in a form-fitting and/or force-fitting and/or firmly-bonded manner.

It can be favorable if the support plate is an injection-molded component.

A sealing ring for fixing the membrane and/or the sealing element is preferably an injection-molded component.

A sealing element, and in particular a sealing lip, is preferably an injection-molded component.

It can be provided for the support plate to be produced or producible together with the sealing ring for fixing the membrane and/or the sealing element, and/or together with the sealing element—in particular, the sealing lip—in a multi-stage injection molding process, and in particular a 2K injection molding process. It may be favorable if the production is carried out in a single die, wherein, initially, the support plate, and then the sealing ring and/or the sealing element—in particular, the sealing lip—preferably are produced in succession and/or using different materials—in particular, different plastic materials.

The sealing ring and the sealing element—in particular, the sealing lip—are preferably formed from a material that is different from the material of the support plate.

It may be favorable if the sealing ring and the sealing element—in particular, the sealing lip—are designed as a common component and/or are formed from the same material—for example, a resilient sealing material.

The membrane can in particular be introduced as an insert element into a die for producing the sealing device, and then overmolded. In particular, a form-fitting reception of the membrane in the sealing ring can be achieved thereby.

A sealing ring for receiving the membrane surrounds or engages around the membrane—preferably radially peripherally and/or on both main sides of the membrane. In particular, the sealing ring preferably engages around the membrane in a substantially C-shaped manner in an edge region thereof.

It can be provided that the sealing ring and the sealing element, and in particular the sealing lip, be connected to one another by means of one or more crosspieces—for example, by means of at least three, and preferably at least five, crosspieces. The crosspieces extend in particular from the sealing ring radially outwards to the sealing element, and in particular to the sealing lip.

It can be advantageous if the support plate comprises one or more receiving regions for receiving the one or more crosspieces.

The one or more receiving regions are in particular recesses which are filled by means of the one or more crosspieces. Preferably, a substantially planar surface of the sealing device thus results.

The sealing ring and/or the sealing element—in particular, the sealing lip—and/or one or more crosspieces, preferably extend on an underside of the support plate on which the holding element is arranged.

Alternatively, it can be provided that the sealing ring and/or the sealing element—in particular, the sealing lip—and/or one or more crosspieces, extend on an upper side, facing away from the holding element, of the support plate.

It can be favorable if the membrane is made of an open-pore material.

The membrane is in particular air-permeable and/or water-impermeable.

For example, the membrane comprises a polytetrafluoroethylene (PTFE) material and/or graphene, or is formed from an—in particular, open-pore—PTFE material and/or a graphene material.

It can be favorable if the membrane comprises a fleece material or is formed therefrom.

It can be provided that the pressure equalization apparatus comprise a protective cover which covers the remaining components of the pressure equalization apparatus and which is in particular releasably connected to the main element of the pressure equalization apparatus.

It can be advantageous if the protective cover is connected to the main element in a firmly-bonded and/or force-fitting and/or form-fitting manner.

For example, the protective cover is fixed to the main element by clipping, screwing, hot caulking, and/or welding.

It can be advantageous if the pressure equalization apparatus comprises a monitoring device, by means of which an opening process of the pressure equalization apparatus can be detected and/or by means of which it is possible to monitor whether the pressure equalization apparatus is in an open or in a closed state.

The monitoring device preferably comprises a magnet and a Hall sensor, wherein the Hall sensor is fixed relative to a change in position of the sealing device.

In particular, a change in a magnetic field of the magnet can be detected when the sealing device is moved from the closed position, in which the sealing device bears against the main element, into an open position, in which the sealing device is spaced apart from the main element.

For example, the magnet is arranged between the membrane of the sealing device and the spring element of the connection device in the opening direction.

Additionally or alternatively, it can be provided that the pressure equalization apparatus comprise an EMC (electromagnetic compatibility) protective element, which serves to increase the electromagnetic compatibility of the pressure equalization apparatus.

Preferably, touch-protection elements can be provided in the pressure equalization apparatus—for example, in the form of an insulating cover or sheath.

For example, an insulating coating can be provided on the protective cover, or the protective cover can be manufactured from an insulating material, as a result of which, in particular—even in the case of short circuits and/or released electrical charges—a risk-free contact of the protective cover is possible.

It may be favorable if the main element comprises an adapter portion of annular design for fixing the pressure equalization apparatus to and/or in a wall of an electrochemical system.

The adapter portion preferably comprises a fixing element which is designed as part of the following fixing mechanisms:

bayonet closure; and/or
screw connection; and/or
clip connection.

The mounting of the pressure equalization apparatus can take place, depending upon the fixing mechanism, from an outer side, facing away from the interior, of the wall of the electrochemical system, or from an inner side, facing the interior, of the wall.

In embodiments in which the pressure equalization apparatus is fixed by a bayonet closure to a wall of an electrochemical system, it can be provided that the bayonet closure be designed such that the pressure equalization apparatus can be released and/or mounted exclusively from a side facing the interior.

In the case of a clip connection, it can be provided that the clip connection be formed from a polymer material or from a metallic material.

Alternatively, it can be provided that one part of the clip connection be formed from a metallic material and one part of the clip connection be made of a polymer material.

It may be favorable if the pressure equalization apparatus is fixed, by a two-component connection, to the wall of the electrochemical system. For example, the pressure equalization apparatus is fixed to the wall of the electrochemical system by a bayonet ring and a counter element—for example, a lock nut.

Preferably, the main element is formed in one piece.

Alternatively thereto, it can be provided that the main element be multi-part and the different elements of the main element be connected to one another in a force-fitting and/or form-fitting and/or firmly-bonded manner.

It can be provided that the main element comprise a central portion for receiving at least one component of the sealing device, and/or that the main element comprise an outer ring which surrounds the central portion and is intended for supporting the main element on the adapter portion of the main element and/or for depositing the sealing device on the main element.

The main element preferably comprises a central portion and an outer ring which surrounds the central portion at a distance therefrom, wherein the central portion and the outer ring are connected to one another by means of one or more ribs of the main element.

The one or more ribs each form a touch protection, for example.

In particular for minimizing a moisture input into the interior of the pressure equalization apparatus, it can be provided that the pressure equalization apparatus comprise a dehumidifying device, which is arranged in particular in the interior of the pressure equalization apparatus, and/or comprise a hygroscopic material.

Preferably, the pressure equalization apparatus additionally or alternatively has one or more of the following features or one or more of the following advantages:

- a connection between a wall of the electrochemical system and the pressure equalization apparatus has a fluid-tightness which remains substantially unchanged over a service life of the electrochemical system up to an opening of the pressure equalization apparatus; and/or
- the pressure equalization apparatus consists of elements which can be produced easily, so that they can be produced cost-effectively, and several pressure equalization apparatuses can be integrated into an electrochemical system without causing excessive costs; and/or
- a fluid exchange between the interior of the pressure equalization apparatus and the surroundings of the pressure equalization apparatus in the closed state of the pressure equalization apparatus is minimized; and/or
- the pressure equalization apparatus has a pressure-independent width and/or a pressure-independent cross-section, perpendicular to the opening direction; and/or
- the pressure equalization apparatus can be opened several times in a non-destructive manner, as a result of which, in particular, an end-of-line check can be carried out.

The invention further relates to an electrochemical system.

In this regard, the invention is based upon the object of providing an electrochemical system, in which, when a critical pressure is exceeded in an interior of the electrochemical system, a pressure equalization with respect to surroundings of the electrochemical system can be brought about, and which can be produced as easily as possible.

This object is achieved by an electrochemical system according to the independent claim directed at an electrochemical system.

The electrochemical system comprises one or more pressure equalization apparatuses according to the invention, wherein the one or more pressure equalization apparatuses preferably are fixed to and/or in a wall of the electrochemical system—in particular, in a form-fitting and/or force-fitting and/or firmly-bonded manner.

The electrochemical system according to the invention preferably has one or more of the features cited in connection with the pressure equalization apparatus according to the invention, and/or one or more of the advantages cited in connection with the pressure equalization apparatus according to the invention.

It may be favorable if the one or more pressure equalization apparatuses are fixed to and/or in the housing wall of the electrochemical system as follows:
by means of a bayonet closure; and/or
by means of a screw connection; and/or
by means of a clip connection.

The following description and the drawings of embodiments relate to further features and/or advantages of the invention.

The same or functionally equivalent elements are provided with the same reference signs in all figures.

DETAILED DESCRIPTION OF THE DRAWINGS

FIGS. 1 through 9 show an embodiment of a pressure equalization apparatus designated as a whole by 100, which is fixed on and/or in a wall 102 of an electrochemical system 104 which is not shown in its entirety in FIGS. 1 through 9.

Figure 10:
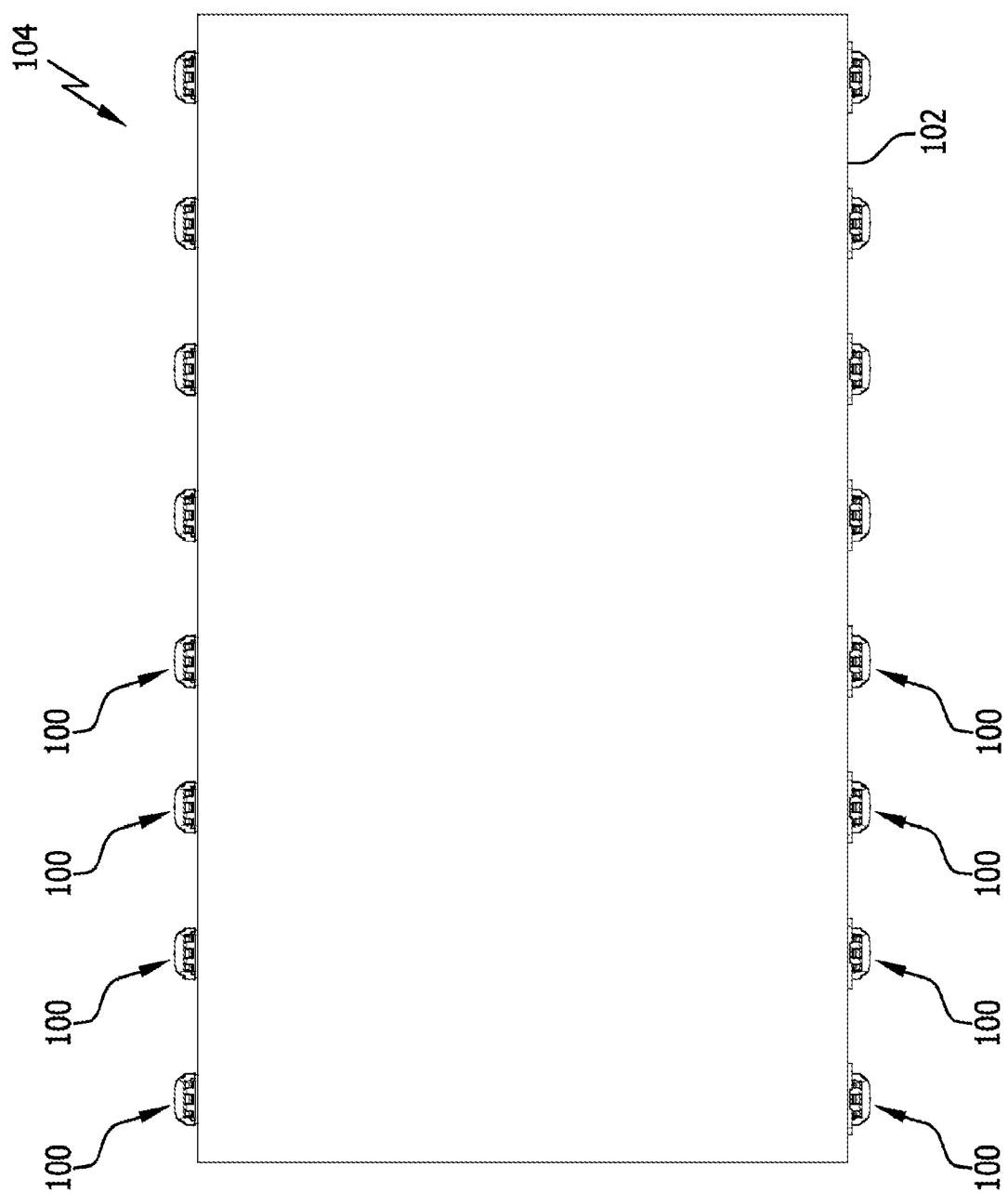
FIG. 10 a schematic view of an electrochemical system comprising several pressure equalization apparatuses.
Figure 11:
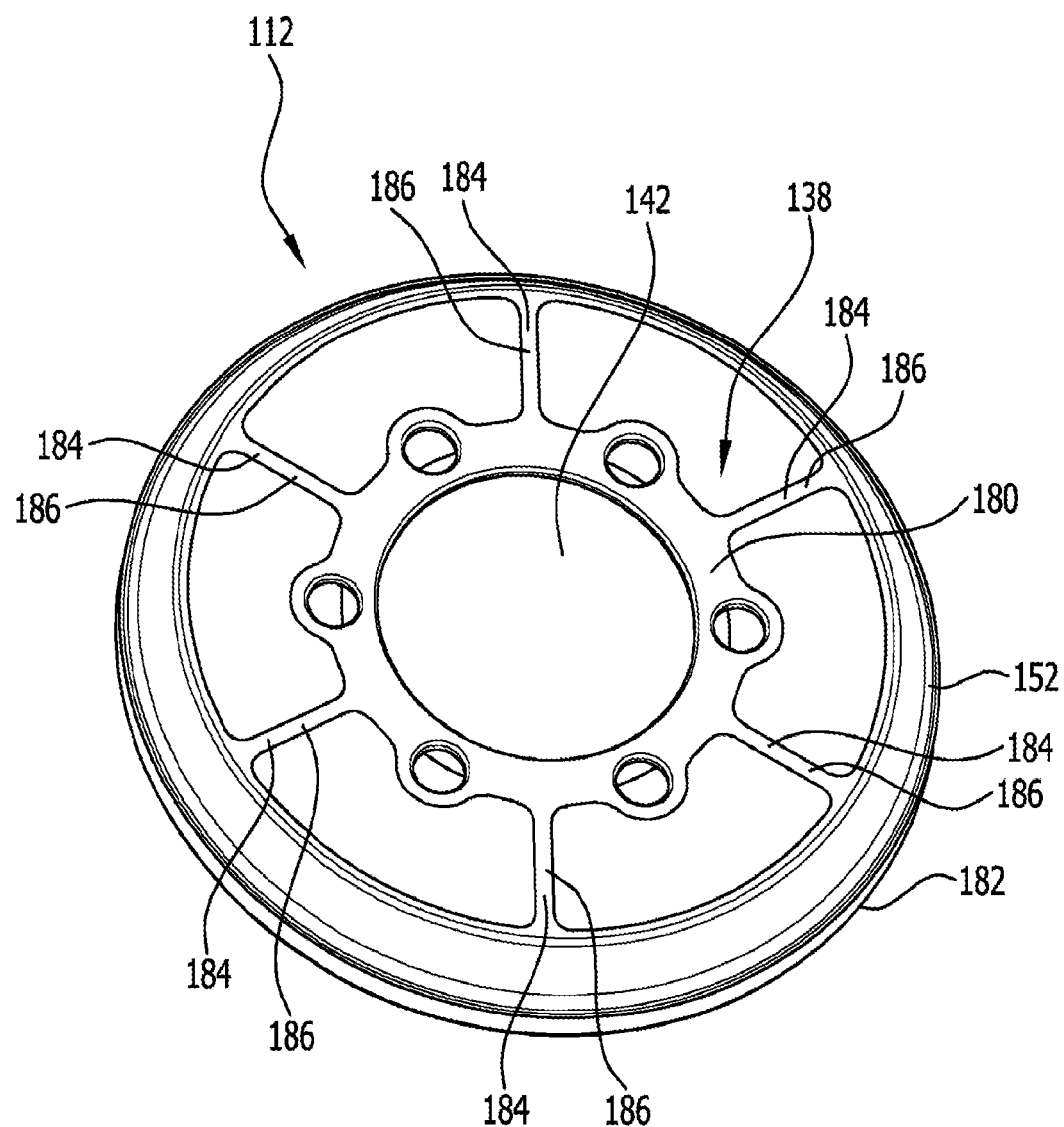
FIG. 11 a schematic perspective view of an alternative embodiment of a sealing device which is produced in a multi-stage injection molding process.
Figure 12:
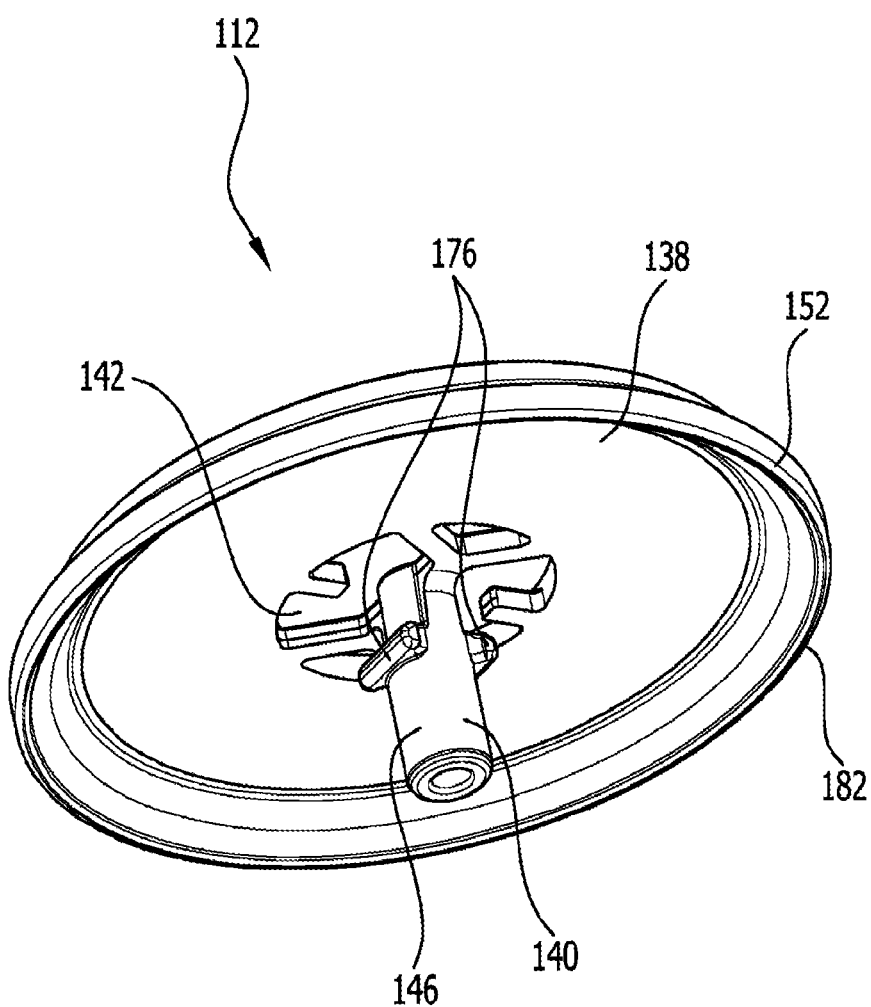
FIG. 12 a schematic perspective view of the sealing device from FIG. 11, with a view of an underside of the sealing device.
Figure 13:
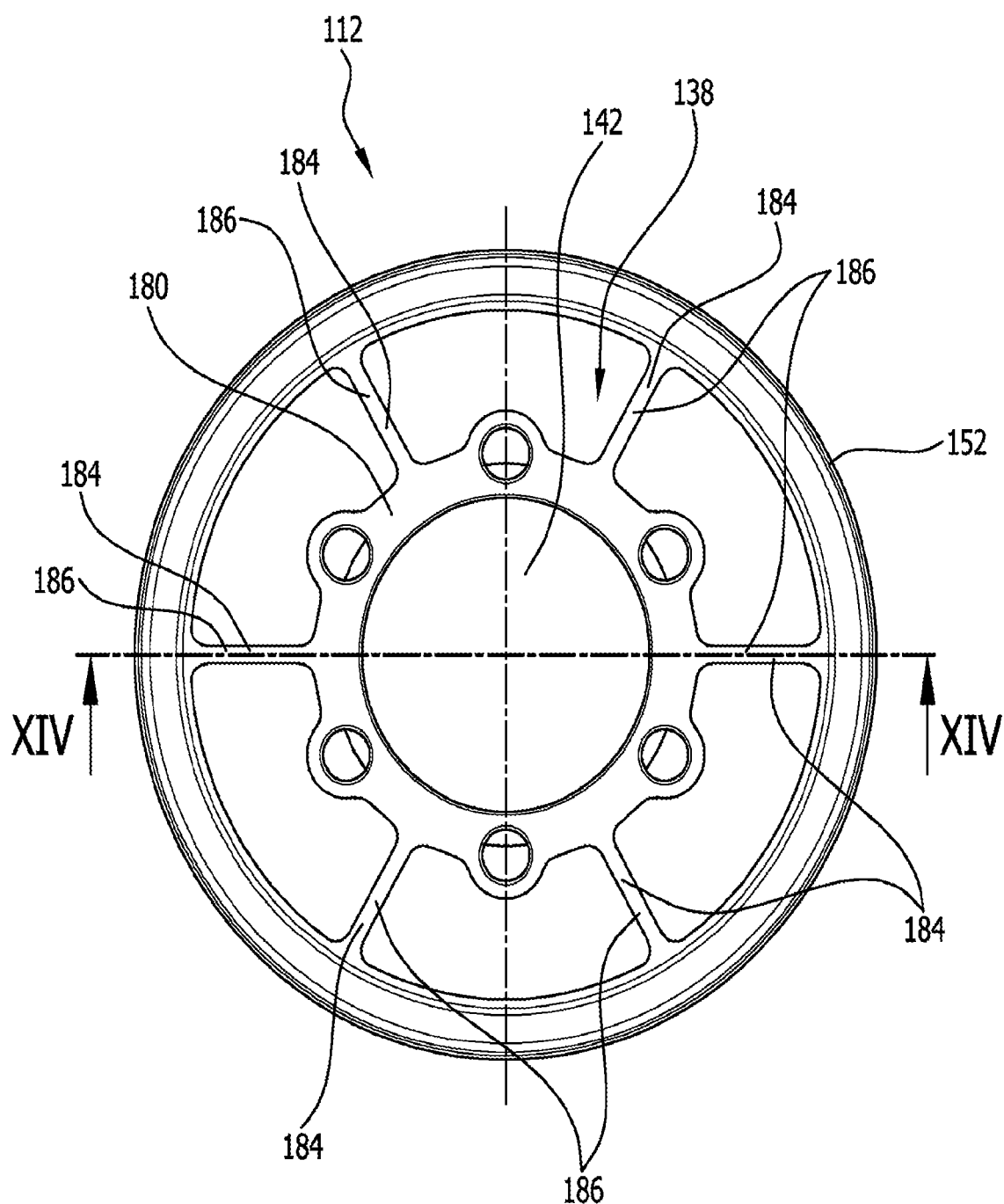
FIG. 13 a plan view of the sealing device from FIG. 11.
Figure 14:
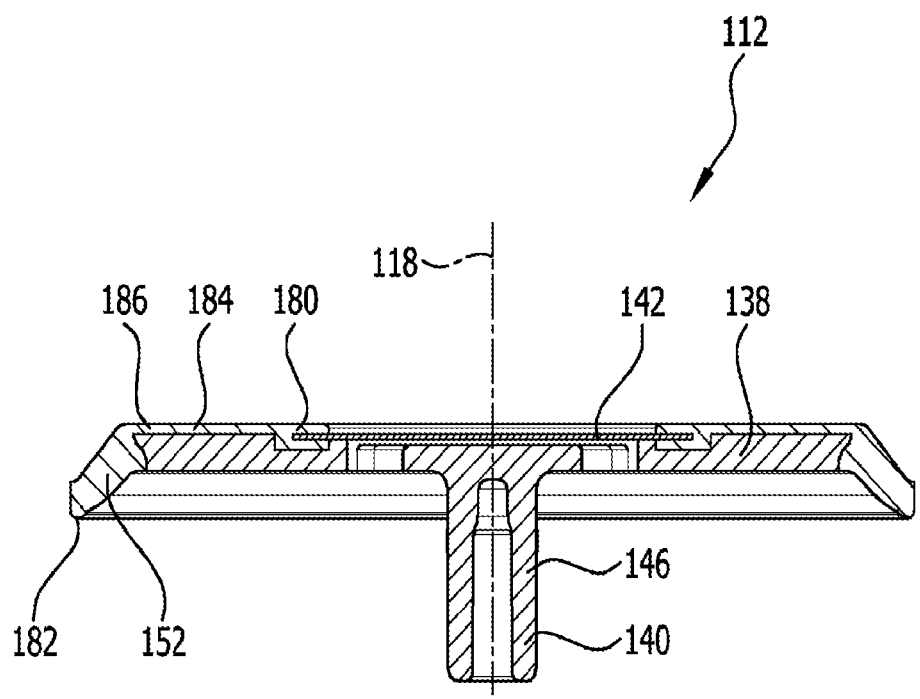
FIG. 14 a schematic cross-section through the sealing device of FIG. 11 along the line XIV-XIV in FIG. 13.
Figure 15:
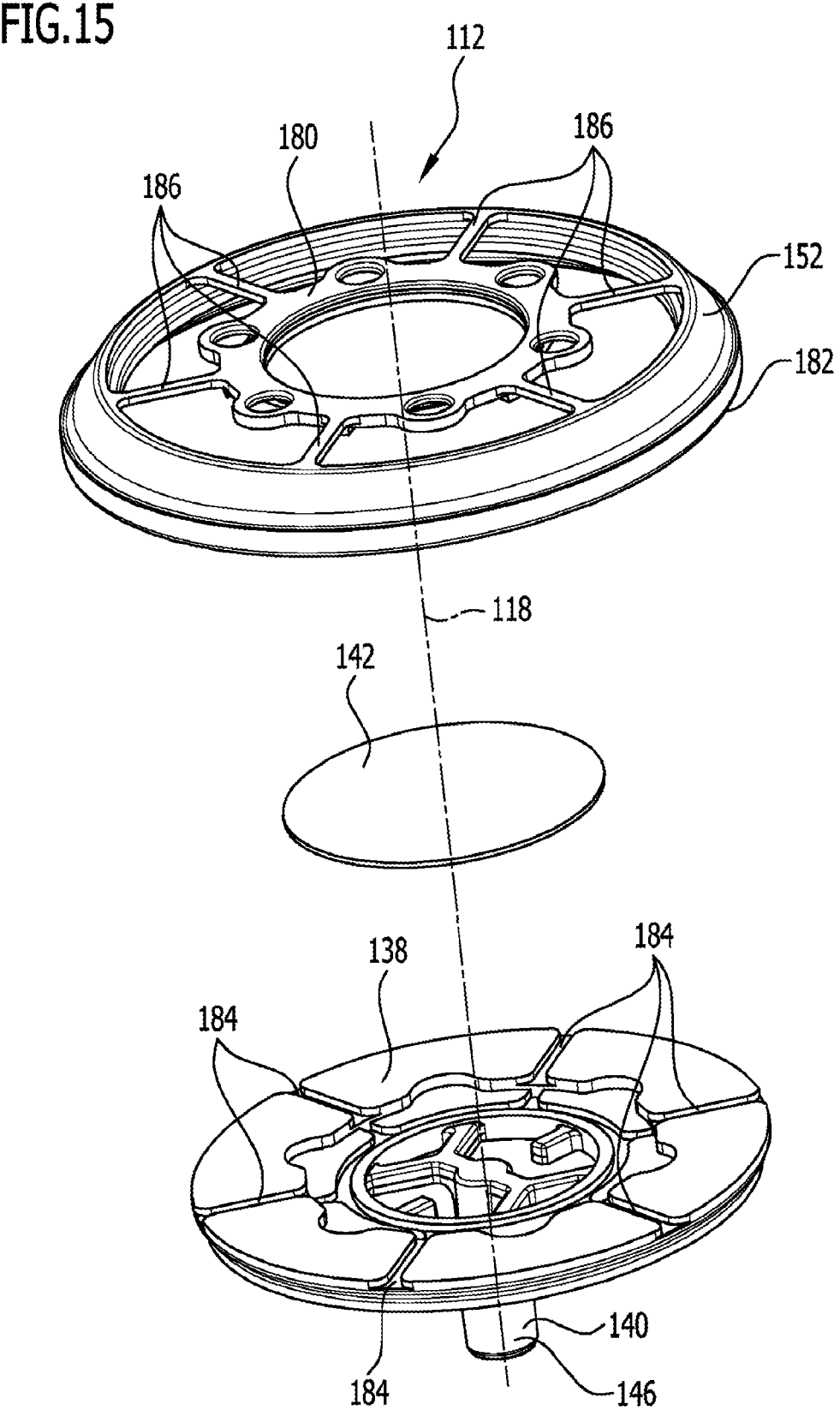
FIG. 15 an exploded view of the sealing device from FIG. 11.
Figure 16:
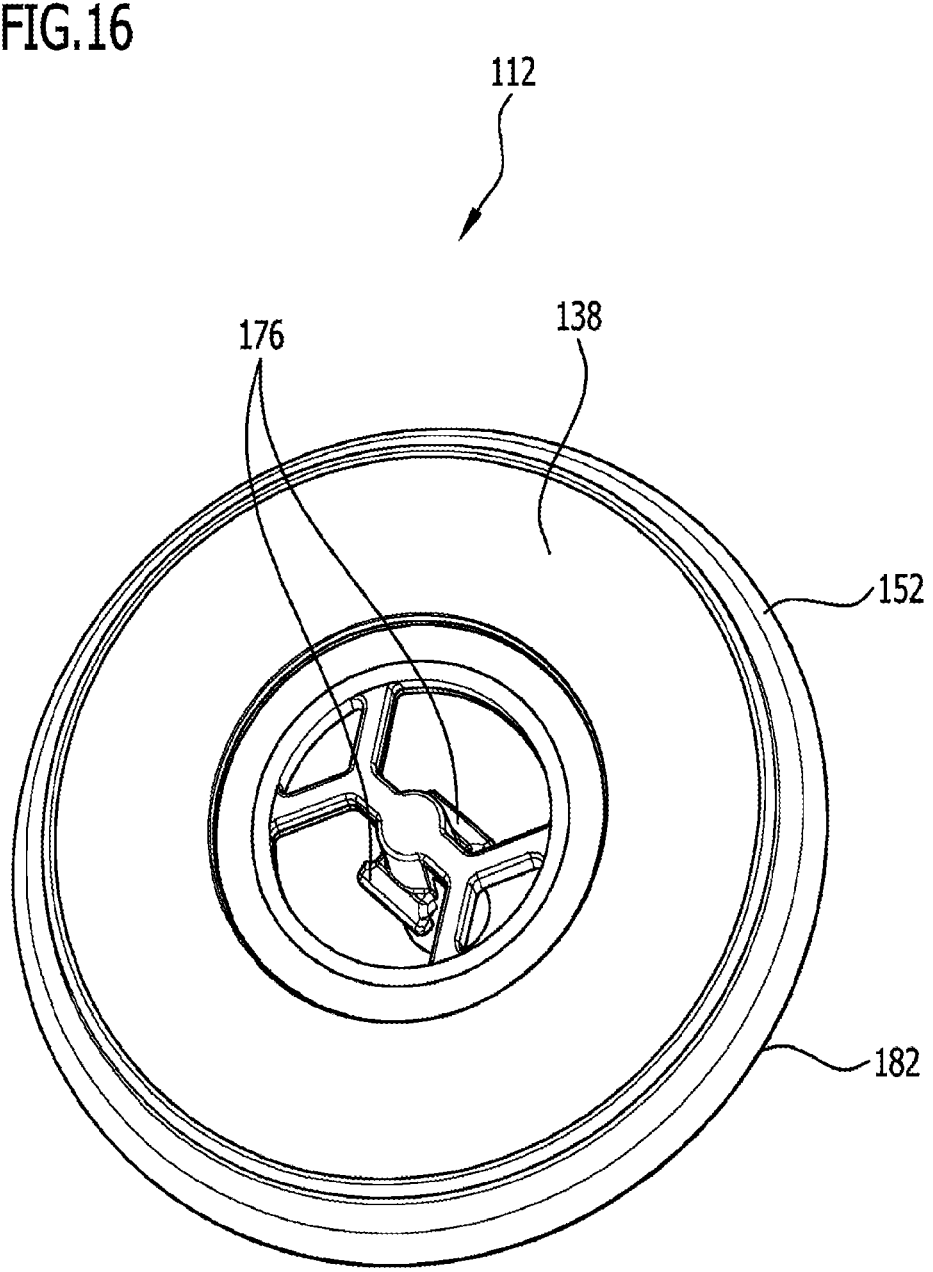
FIG. 16 a schematic perspective view of a further alternative embodiment of a sealing device, produced in a multi-stage injection molding process.
Figure 17:
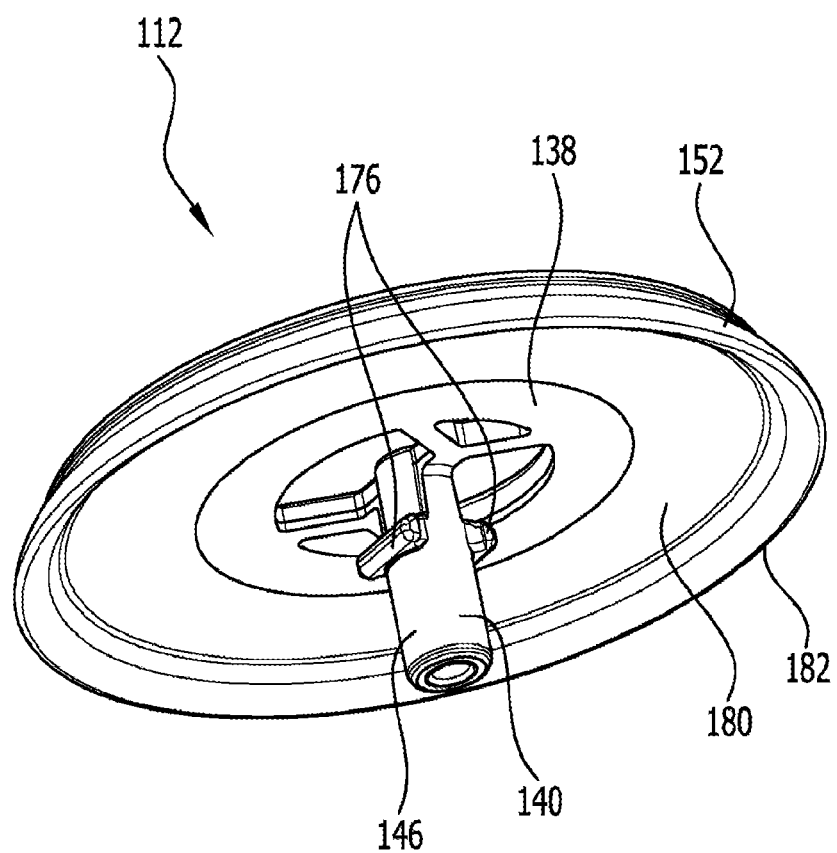
FIG. 17 a schematic perspective view of the sealing device from FIG. 16, with a view of an underside of the sealing device.
Figure 18:
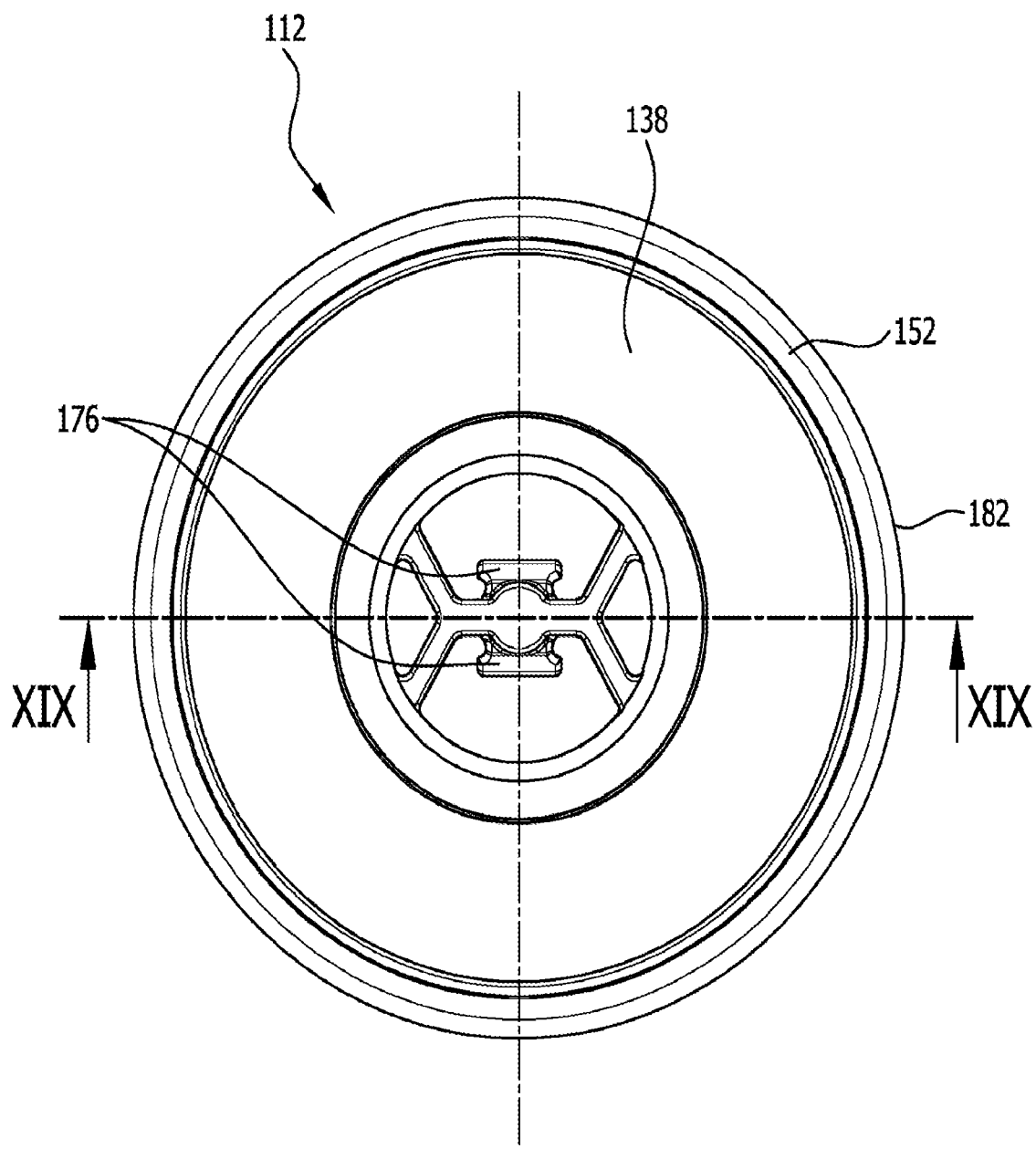
FIG. 18 a plan view of the sealing device from FIG. 16.
Figure 19:
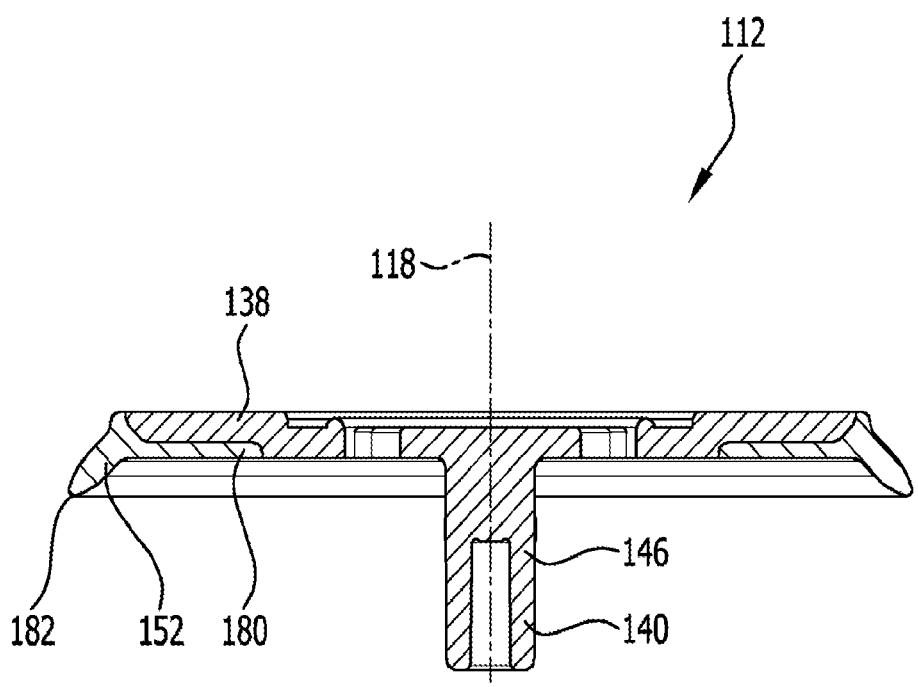
FIG. 19 a schematic section through the sealing device of FIG. 16, along line XIX-XIX in FIG. 18.
Figure 20:
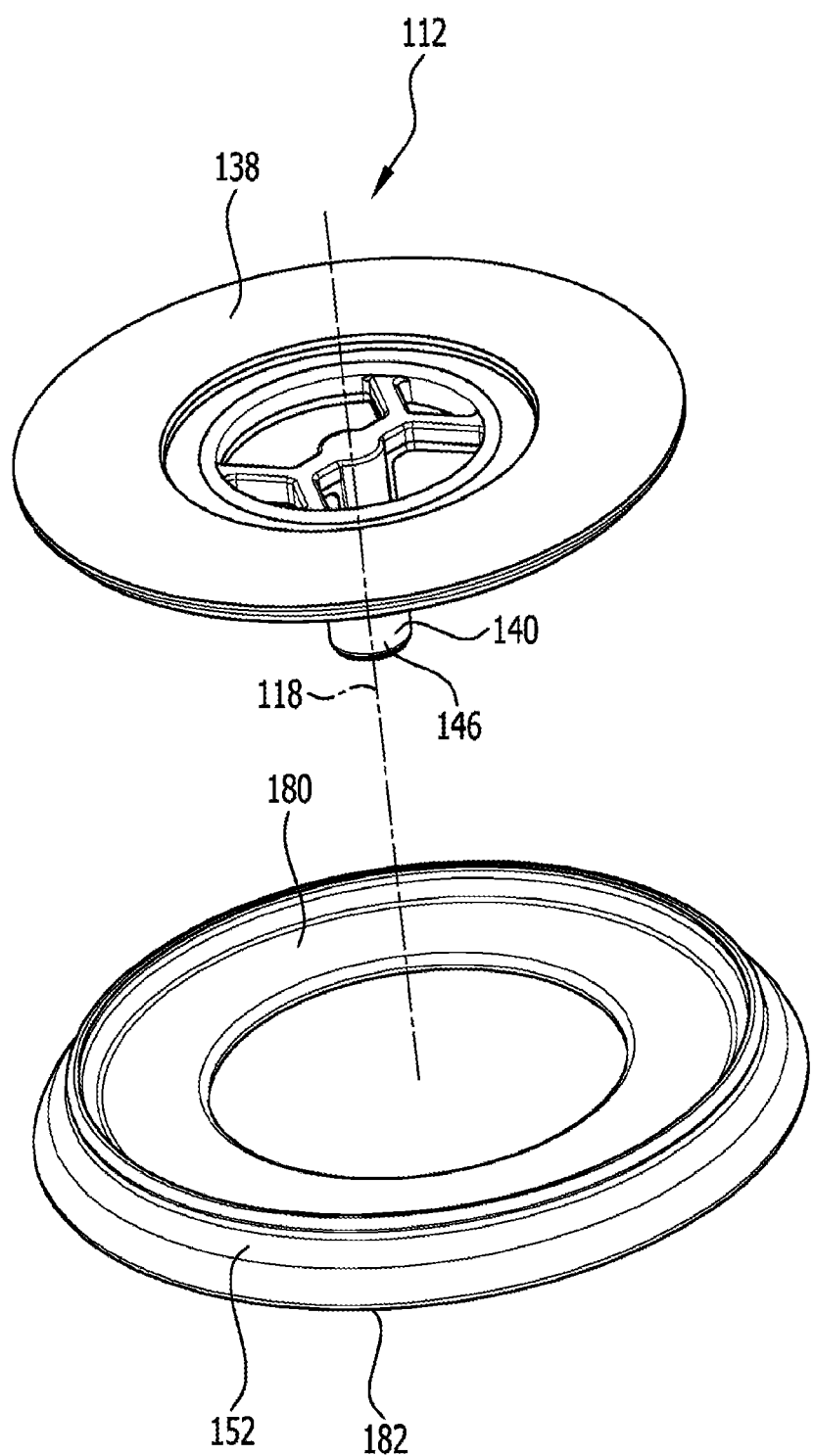
FIG. 20 an exploded view of the sealing device from FIG. 16.

An electrochemical system 104 by way of example is shown in FIG. 10. The electrochemical system 104 is, for example, a battery accumulator.

The electrochemical system 104 is particularly suitable for use in vehicles. The electrochemical system 104 preferably comprises several electrochemical cells which in particular include batteries—for example, lithium-ion batteries.

It may be advantageous if the electrochemical system 104 comprises one or more pressure equalization apparatuses 100.

The pressure equalization apparatus 100 is shown in all figures in a closed state.

The pressure equalization apparatus 100 is preferably used for pressure equalization between an interior 106 of the pressure equalization apparatus 100 and/or the electrochemical system 104, and surroundings 108 of the pressure equalization apparatus 100.

In the present case, the pressure equalization apparatus 100 comprises a main element 110, a sealing device 112, and a connection device 114.

The main element 110 is preferably used to stabilize and/or fix the pressure equalization apparatus 100. In particular, the main element 110 comprises an at least approximately hollow-cylindrical outer ring 116 which, in an assembled state of the pressure equalization apparatus 100, bears against a side, facing away from the interior 106, of the wall 102 and/or forms a guide for fluid flowing out of the interior 106 in the open state of the pressure equalization apparatus 100.

In a cross-section taken perpendicularly to an opening direction 144 of the pressure equalization apparatus 100, the pressure equalization apparatus 100 is, in the present case, at least approximately circular.

Alternatively, it can be provided that the pressure equalization apparatus 100 be formed so as to be at least approximately oval or rectangular in a cross-section taken perpendicularly to the opening direction 144.

In particular, a width and/or a diameter of an opening channel of the pressure equalization apparatus 100 surrounded by the main element 110, in a plane perpendicular to the opening direction, is greater by a factor of three or more, and in particular by a factor of five or more, than an extension of the pressure equalization apparatus 100 in a direction extending parallel to the opening direction 144.

With respect to a central axis 118 of the pressure equalization apparatus 100, lying radially inwards relative to the outer ring 116, the main element 110 preferably comprises a central portion 120, which serves in particular to receive and/or stabilize the sealing device 112 and/or connection device 114.

It can be advantageous if the outer ring 116 is connected to the central portion 120 by ribs 124 extending along radial directions with respect to the central axis 118.

For example, the ribs 124 each form a contact protection.

The central axis 118 and the opening direction 144 of the pressure equalization apparatus 100 are preferably arranged at least approximately parallel to one another.

The outer ring 116 preferably has an outer portion 126 which rests against the wall 102 on an outer side, facing away from the interior 106, of said wall and/or a support portion 128 which in particular forms a feedthrough through a pressure-equalizing opening 130 in the wall 102 of the electrochemical system 104.

It may be advantageous if the ribs 124 extend radially inwards from the support portion 128.

Preferably, the main element 110 has an adapter portion 132 which is arranged radially outwards relative to the outer ring 116, with respect to the central axis 118 of the pressure equalization apparatus 100.

The adapter portion 132 serves in particular to connect the main element 110 to the wall 102 and/or to seal the connection in a fluid-tight manner.

For example, the main element 110 has a sealing ring 134 which is arranged in a receiving groove provided for this purpose between the adapter portion 132 and the outer ring 116, and in particular forms a fluid-tight seal between the wall 102 and the main element 110. The sealing ring 134 is preferably a shaped seal—for example, an O-ring.

It can be advantageous if the adapter portion 132 has a fixing element for establishing a bayonet closure, which is connected to a fixing element formed in a manner complementary thereto in the wall 102 of the electrochemical system 104 to form a bayonet closure (not shown in detail).

Additionally or alternatively, it can be provided for the adapter portion 132 to be screwed to the wall 102 of the electrochemical system 104.

Combinations of the fixing variants are also conceivable. For example, a bayonet ring can be connected to a counter element—for example, a lock nut.

The connection of the pressure equalization apparatus 100 and the wall 102 is preferably formed completely of a polymer material or completely of a metallic material.

Alternatively, it can be provided that a part of the connection of the pressure equalization apparatus 100 and the wall 102 be made of a polymer material, and a further part be made of a metallic material.

As an alternative to the bayonet closure and/or the screw connection, it can be provided that the pressure equalization apparatus 100 be connected to the wall 102 of the electrochemical system 104 by means of a clip connection.

It can be advantageous if the pressure equalization apparatus 100 has a protective cover 136 which is connected to the adapter portion 132 of the main element 110 in a form-fitting and/or force-fitting manner—for example, by means of a latching connection and/or clip connection.

In addition or as an alternative to a clip connection, the protective cover 136 can be fixed to the adapter section 132 of the main element 110, for example, by a screw connection and/or by hot caulking and/or by a welded connection.

The protective cover 136 serves in particular to protect and/or cover the pressure equalization apparatus 100 on a side facing away from the interior 106.

It can be advantageous if the sealing device 112 comprises a support plate 138 and a holding element 140. The support plate 138 serves, for example, as a rest for a membrane 142 and/or as a fluid resistance.

In the present case, the membrane 142 is firmly bonded to the support plate 138 and/or a sealing ring 180 of the sealing device 112 by gluing and/or welding and/or overmolding.

Additionally or alternatively, the membrane 142 can be fixed on the support plate 138 and/or the sealing ring 180 in a force-fitting and/or form-fitting manner—for example, by clamping.

The holding element 140 preferably extends away from the support plate 138, counter to an opening direction 144 of the pressure equalization apparatus 100. For example, the holding element 140 is a pin 146.

In a closed state of the pressure equalization apparatus 100, the main element 110 and the sealing device 112 are connected to one another in a fluid-tight manner by means of the connection device 114.

For this purpose, the connection device 114 has, in the present case, a spring element 150, the spring force of which acts in particular crosswise to the opening direction 144 and/or to the central axis 118 of the pressure equalization apparatus 100.

In particular, the spring force of the spring element 150 acts in a direction extending at least approximately perpendicular to the opening direction 144 and/or to the central axis 118 of the pressure equalization apparatus 100.

For example, the holding element 140 of the sealing device 112 is fixed by the spring element 150 in such a way that the sealing device 112, e.g., a sealing element 152 of the sealing device 112, bears against the main element 110 on an end, facing away from the interior 106, of the main element 110 and/or is pressed against the main element 110.

Figure 8:
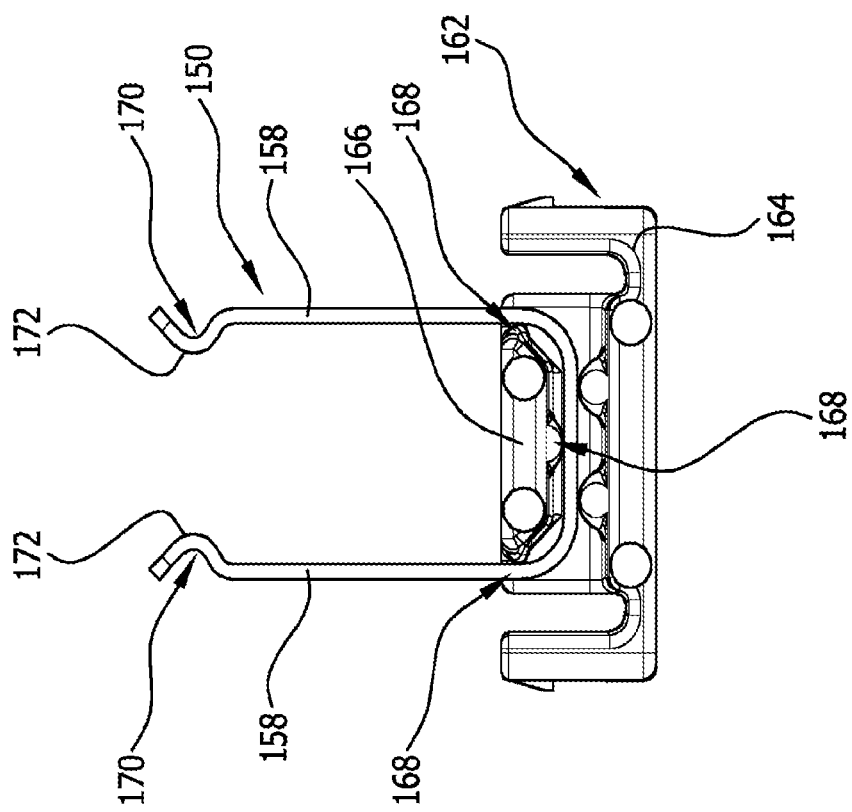
FIG. 8 a schematic side view of the connection device from FIG. 7, in which a three-point reception of a receiving element can be seen, in which receiving element a spring element of the connection device is received.
Figure 7:
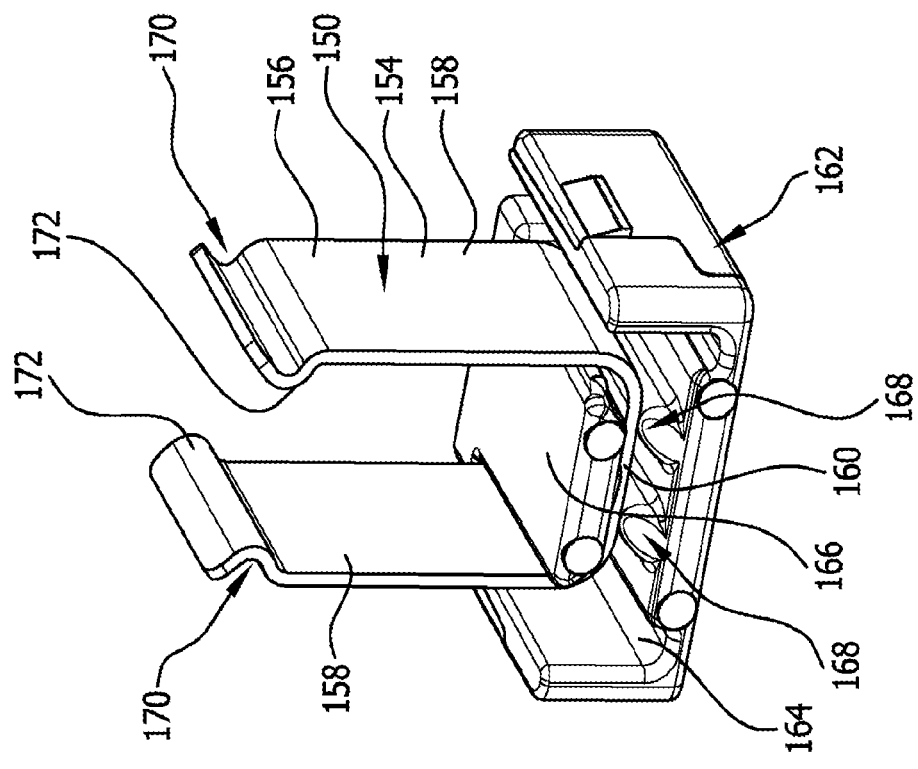
FIG. 7 a schematic perspective view of a connection device of the pressure equalization apparatus from FIGS. 1 through 6, by means of which the sealing device and the main element of the pressure equalization apparatus are connected to one another in a sealing manner in the closed state.

As can be seen in particular in FIGS. 7 and 8, the spring element 150 is preferably a leaf spring 154 and/or a shaped spring 156.

In the present case, the spring element 150 is at least approximately U-shaped in a cross-section taken parallel to the opening direction 144 of the pressure equalization apparatus 100.

In particular, the spring element 150 has two legs 158 which extend away from a connecting portion 160 of the spring element 150 in directions facing away from the interior 106. A main extension plane of the connection portion 160 is preferably arranged at least approximately perpendicular to the opening direction 144 of the pressure equalization apparatus 100.

According to an alternative embodiment, not shown in the drawings, the spring element 150 is arranged so as to be rotated by 180° compared to the embodiment illustrated in FIGS. 1 through 9. In particular, a holding element of the main element 110 is, in the closed state of the pressure equalization apparatus 100, fixed between legs of the spring element 150 (not shown in the drawings).

Particularly for stabilizing and/or fixing the spring element 150, the spring element 150 is received, in the present case, in and/or by a receiving element 162 of the connection device 114. The receiving element 162 is, for example, a receiving shoe.

In the present case, the receiving element 162 has an at least approximately trough-shaped sealing portion 164 and/or a counter holding portion 166.

It may be favorable if the counter holding portion 166 is arranged in a region surrounded by the sealing portion 164.

The sealing portion 164 of the receiving element 162 is preferably received in a sealing manner by the central portion 120 in the closed state of the pressure equalization apparatus 100.

In the present case, the receiving element 162 is at least approximately rectangular in shape in a cross-section taken perpendicularly to the central axis 118 of the pressure equalization apparatus 100.

Preferably, the receiving element 162 is connected in a form-fitting and/or force-fitting and/or firmly-bonded manner to the central portion 120 of the main element 110. For example, the receiving element 162 is clipped into an opening formed by the central portion 120.

It may be favorable if the connection portion 160 of the spring element 150 is received, e.g., clamped, between the sealing portion 164 and the counter holding portion 166 of the receiving element 162.

It can be advantageous if the receiving element 162 has one or more, and in the present case several, punctiform or linear contact regions 168, which are in direct contact with the spring element 150 and/or on which the spring element 150 bears directly.

In particular, regions of the receiving element 162 arranged adjacently to the contact regions 168 are arranged at a distance from the spring element 150.

It may be favorable if the counter holding portion 166 has three contact regions 168, wherein one of the contact regions 168 extends, on a side, facing the interior 106, of the counter holding portion 166, from a main body of the counter holding portion 166, in the direction of the interior 106.

The two further contact regions 168 extend in particular laterally away from the main body of the counter holding portion 166, and/or along radial directions with respect to the central axis 118 of the pressure equalization apparatus 100.

The contact regions 168 are formed, for example, by bulges and/or projections in the receiving element 162.

It can be advantageous if the sealing portion 164 has several, and in the present case two, contact regions 168, which, on a side, facing away from the interior 106, of the sealing portion 164, extend away from a main body of the sealing portion 164 in the direction of the counter holding portion 166.

Preferably, the connection portion 160 of the spring element 150 is received and/or fixed between contact regions 168 of the counter holding portion 166 and contact regions 168 of the sealing portion 164 of the receiving element 162.

It may be favorable if the legs 158 of the spring element 150 are held at a distance and/or are pressed outwards by contact regions 168 of the counter holding portion 166.

In the present case, the spring element 150 has, on the ends facing away from the interior 106, a retaining element 170 on each leg 158.

In the region of the retaining elements 170, the spring element 150 has in particular inwardly-protruding projections, by means of which the holding element 140 of the sealing device 112 is fixed. For example, the retaining elements 170 are latching projections 172.

Figure 1:
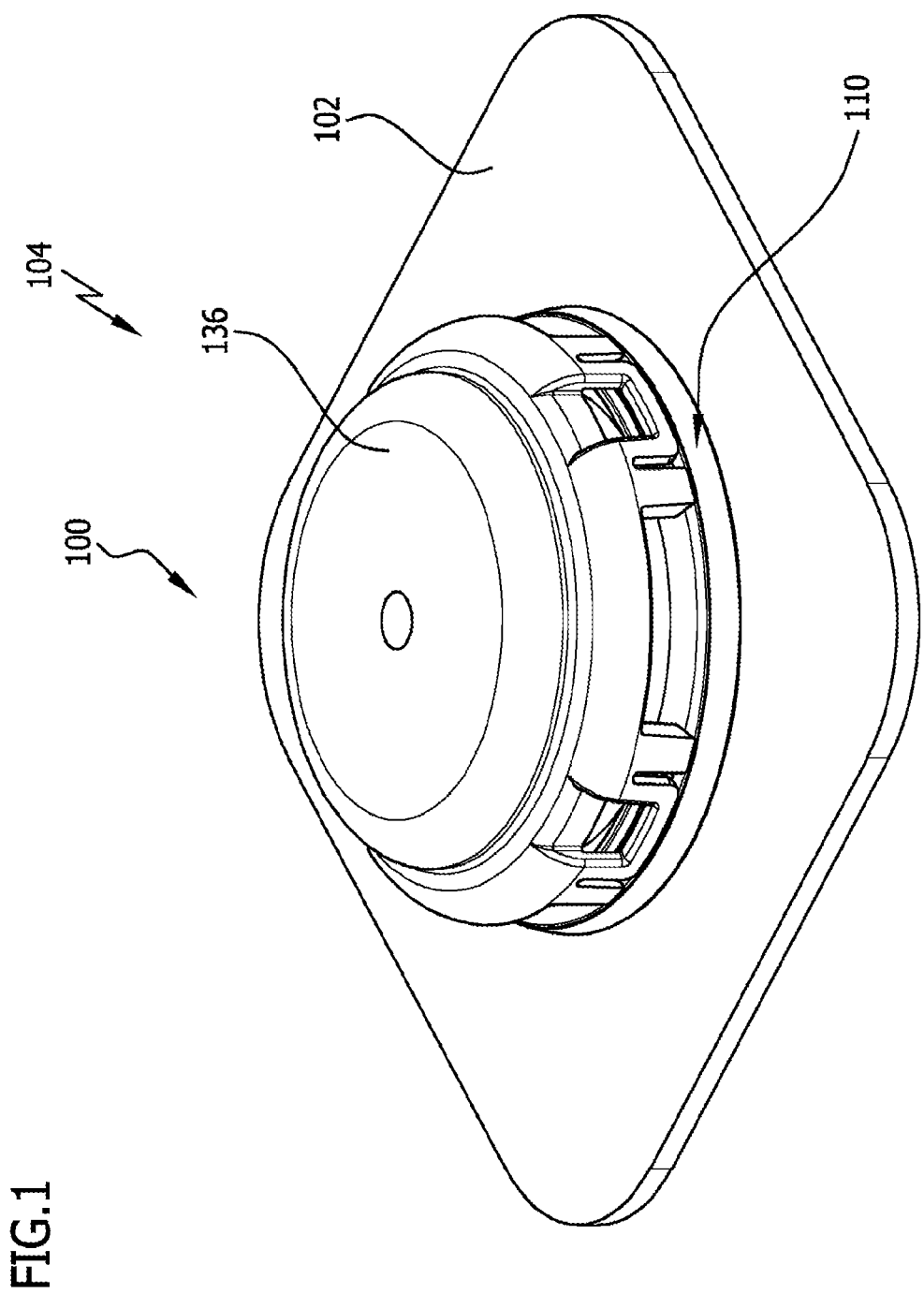
FIG. 1 a schematic perspective view of an embodiment of a pressure equalization apparatus in a wall of an electrochemical system, wherein it is possible for a pressure equalization between an interior of the electrochemical system and the surroundings to be carried out by means of the pressure equalization apparatus in the event of an overpressure within a housing of the electrochemical system.
Figure 2:
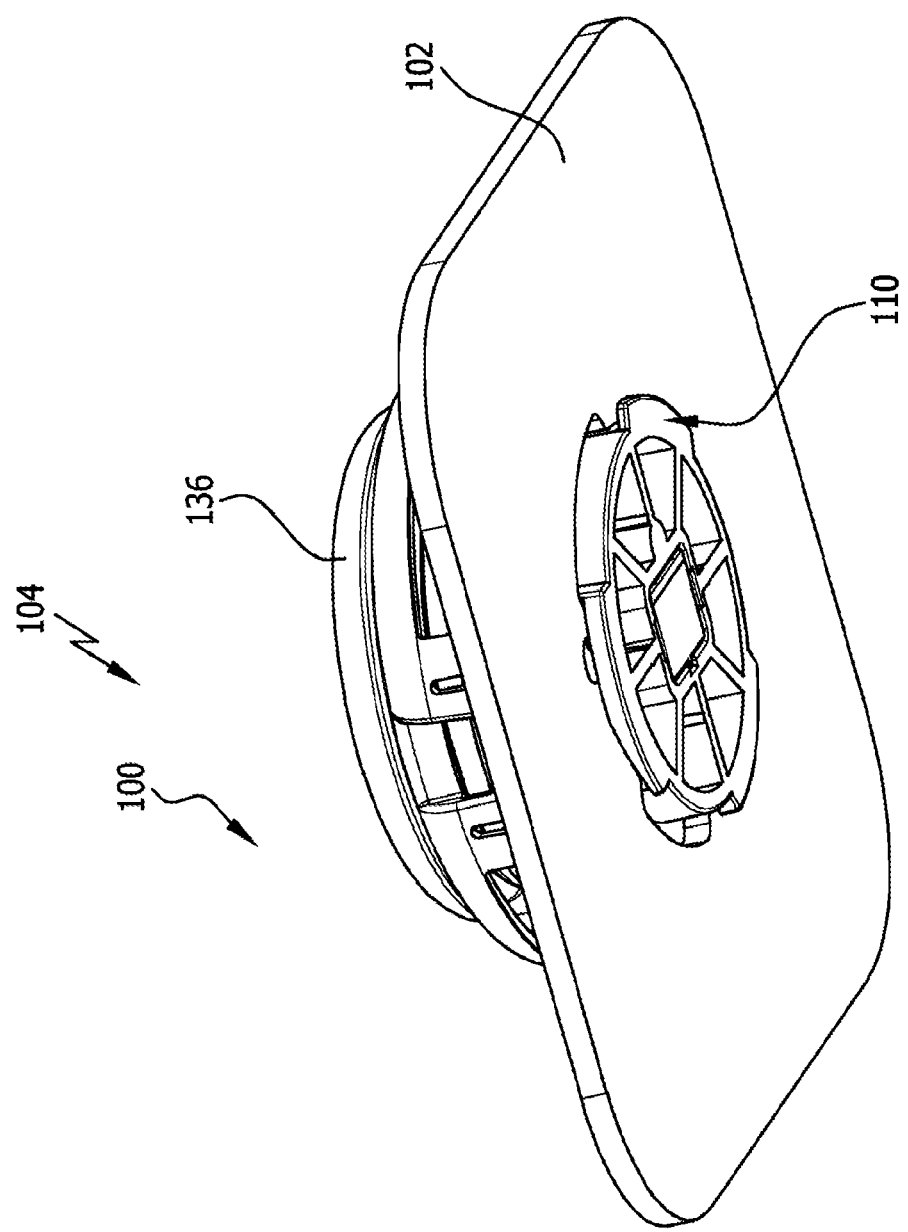
FIG. 2 a schematic perspective view from below of the pressure equalization apparatus from FIG. 1, wherein a side, facing the interior, of a main element is visible.
Figure 3:
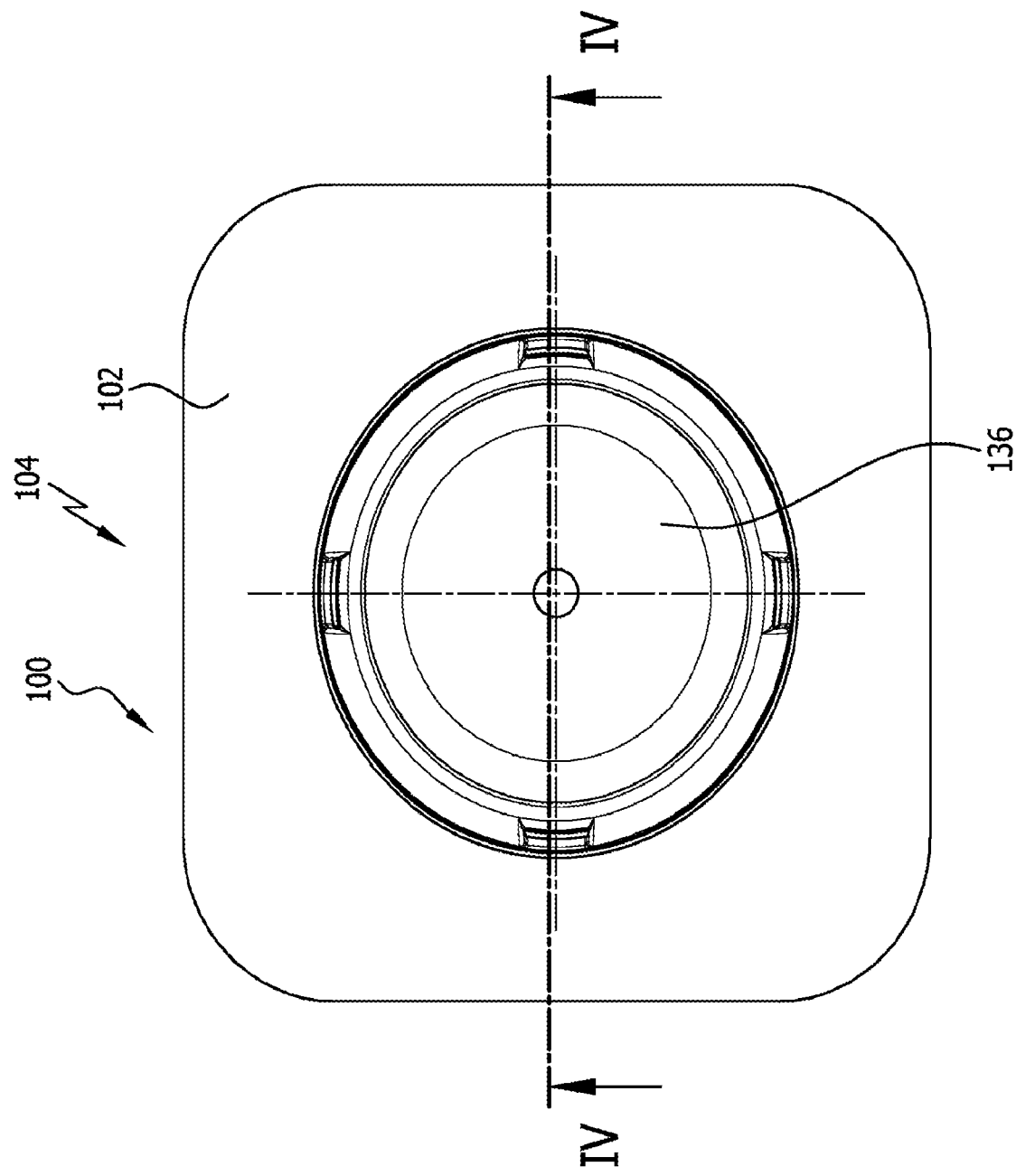
FIG. 3 a schematic plan view of the pressure equalization apparatus from FIGS. 1 and 2.
Figure 4:
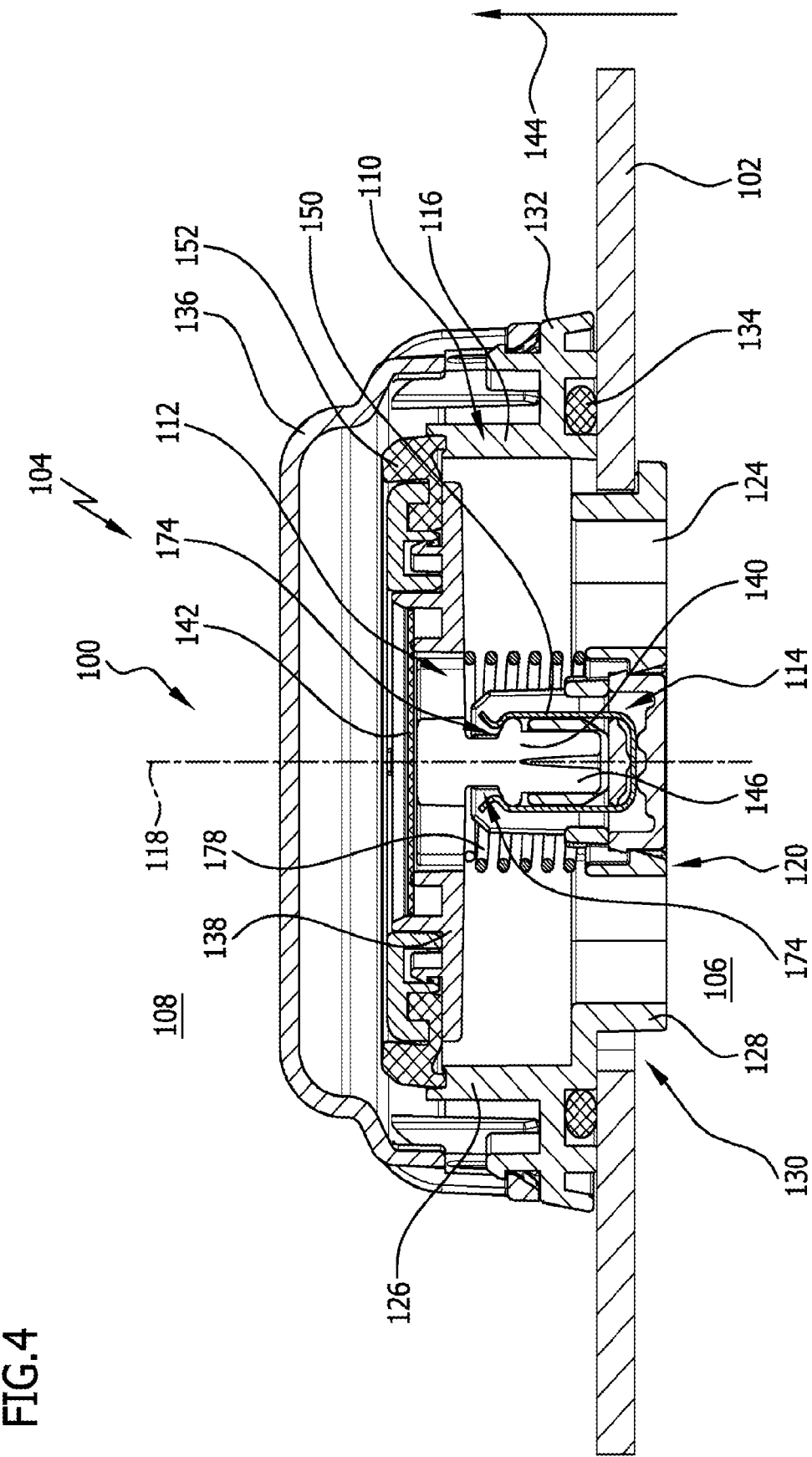
FIG. 4 a schematic sectional view of the pressure equalization apparatus of FIGS. 1 through 3, along a plane denoted by IV in FIG. 3.
Figure 5:
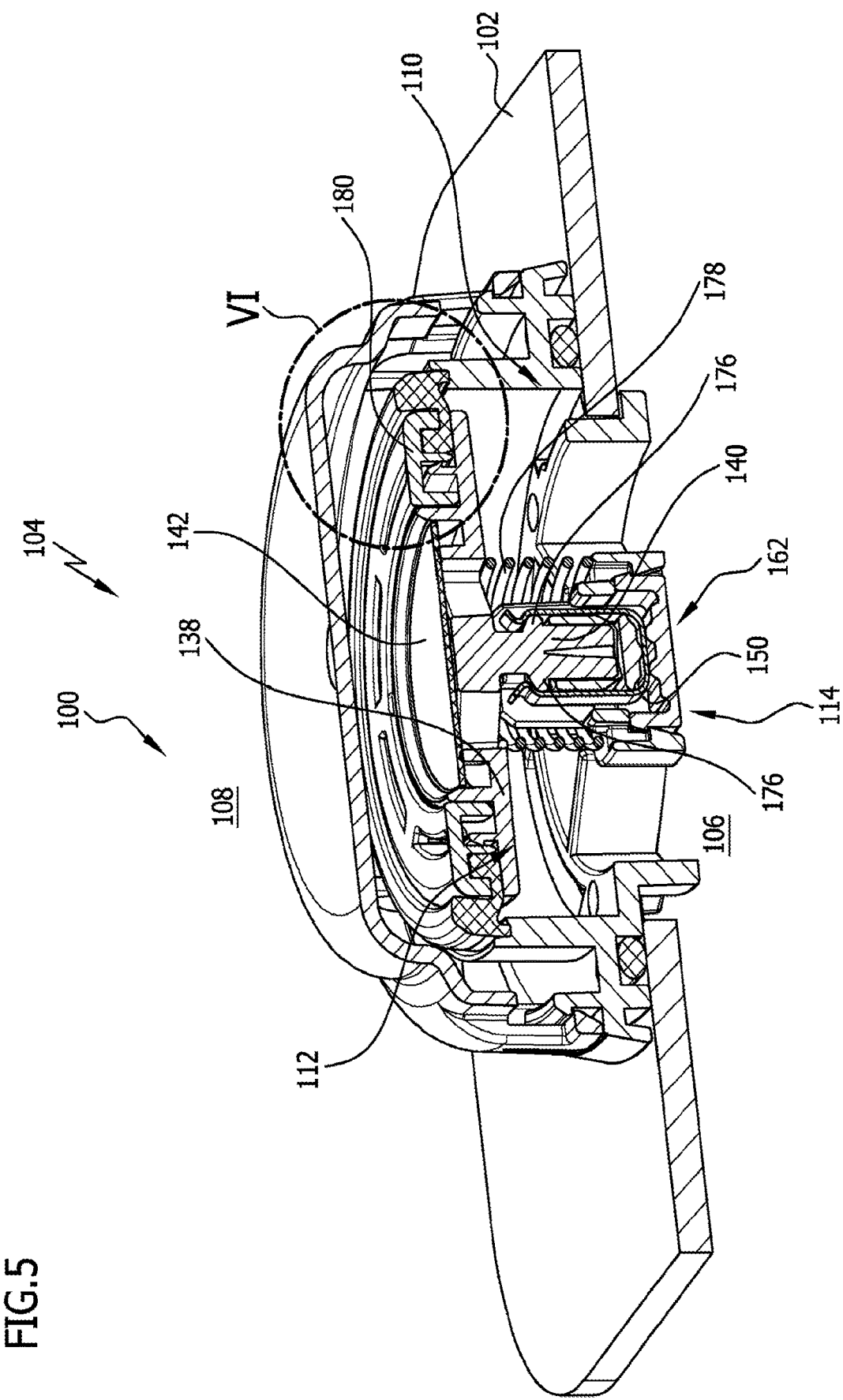
FIG. 5 a schematic perspective view of the sectional view from FIG. 4.

As can be seen in particular in FIGS. 4 and 5, the retaining elements 170 engage in one or more holding recesses 174 of the holding element 140 in the closed state of the pressure equalization apparatus 100. The one or more holding recesses 174 adjoin one or more holding elevations 176—in particular, on a side, facing away from the interior 106, of the holding element 140.

The one or more holding elevations 176 are, for example, holding noses and/or cams.

It can be provided that exactly one holding recess 174 be formed circumferentially around the holding element 140 of the sealing device 112 along a peripheral direction.

Alternatively, it can be provided that the holding element 140 have several holding recesses 174.

In particular, the holding element 140 of the sealing device 112 has exactly one holding elevation 176 extending circumferentially along the peripheral direction.

Alternatively, it can be provided that the holding element 140 have several holding elevations 176.

In the closed state, the legs 158 of the spring element 150 engage around the holding element 140 in the present case.

In addition to the spring element 150 already described, the connection device 114 comprises, in the present case, a further spring element 178, which in the present case is a compression spring in the form of a helical spring.

The spring force of the further spring element 178 preferably acts crosswise, and in the present case at least approximately perpendicularly, to the spring force of the spring element 150.

The further spring element 178 preferably serves to accelerate an opening of the pressure equalization apparatus 100 as soon as a transition from the closed state to the open state has started.

In particular, a complete and/or immediate opening of the pressure equalization apparatus 100 over its entire width and/or its entire cross-section can be formed by the further spring element 178.

It can be advantageous if the further spring element 178 surrounds the holding element 140—in particular, coaxially.

In the closed state of the pressure equalization apparatus 100, the further spring element 178 is preferably in a compressed state.

When a critical pressure in the interior 106 of the pressure equalization apparatus 100 is exceeded, the sealing device 112 is pressed in the opening direction 114 in particular in such a way that the legs 158 of the spring element 150 are pressed radially outwards, and a latching between the holding element 140 of the sealing device 112 and the spring element 150 of the connection device 114 is released.

The further spring element 178 passes in particular from the compressed state into a relaxed state, and a fluid-tight connection between the sealing device 112 and the main element 110 is released.

The pressure equalization apparatus 100 reaches the open state in particular by release of the connection between the spring element 150 and the holding element 140. As a result, fluid can flow out of the interior 106 into the surroundings 108 of the pressure equalization apparatus 100.

The opening of the pressure equalization apparatus 100 is preferably irreversible.

In particular, in the open state of the pressure equalization apparatus 100, the retaining elements 170 of the spring element 150 form stops for a movement of the sealing device 112 counter to the opening direction 144 of the pressure equalization apparatus 100. The pressure equalization apparatus 100 is thereby held in the open state.

The pressure equalization apparatus 100 preferably comprises a monitoring device which serves to monitor an opening process of the pressure equalization apparatus 100. For this purpose, the monitoring device in the present case comprises a magnet and a sensor element designed as a Hall sensor.

It may be favorable if the magnet is arranged in a recess, formed coaxially with respect to the central axis 118 of the pressure equalization apparatus 100, between the support plate 138 and the membrane 142.

The Hall sensor is preferably arranged on an outer side, facing away from the interior 106, of the protective cover 136.

Alternatively, the Hall sensor can also be arranged outside the pressure equalization apparatus 100, provided that it is fixed in a non-moving manner relative to the sealing device 112, irrespective of whether the pressure equalization apparatus 100 is in an open or in a closed state.

During an opening process of the pressure equalization apparatus 100 and a movement of the sealing device 112 taking place during this, the Hall sensor preferably detects the change in the magnetic field of the magnet.

In particular, due to a changed magnetic field of the magnet, it is possible to monitor before and after the opening process whether the pressure equalization apparatus 100 is in an open or in a closed state.

It can be provided that the pressure equalization apparatus 100 comprise a dehumidifying device for dehumidifying the air. The dehumidifying device is, for example, formed completely or in part by the membrane 142, into which hygroscopic material is introduced and/or on which hygroscopic material is applied.

Additionally or alternatively, the dehumidifying device can also be formed completely or in part as an interchangeable element. The interchangeable element is in particular designed as a replaceable, interchangeable cylinder, in which a filling of hygroscopic material, e.g., silica gel, is contained.

In addition or as an alternative to a dehumidifying device, one or more EMC protective elements can be provided.

For safe handling of the pressure equalization apparatus 100, it can be advantageous if the protective cover 136 comprises an electrically-insulating material, e.g., in the form of a protective layer, or is formed of an electrically-insulating material. Thus, the protective cover 136 comprises a touch protection element or forms a touch protection element.

The critical pressure preferably corresponds to an opening pressure of the pressure equalization apparatus 100. This can be adjusted by the shape and material thickness of the spring element 150.

It may be favorable if a ratio of a length of the spring element 150 parallel to the opening direction 144 to an average material thickness of the spring element 150 is ca. 4:1 or more, and in particular ca. 10:1 or more—for example, ca. 20:1 or more.

In particular, the ratio of the length of the spring element 150 parallel to the opening direction 144 to the average material thickness of the spring element 150, is ca. 100:1 or less, and in particular ca. 90:1 or less—for example, ca. 80:1 or less.

For example, the average material thickness of the spring element 150 is ca. 0.2 mm or more, and in particular ca. 0.4 mm or more.

The average material thickness of the spring element 150 is preferably ca. 1 mm or less, and in particular ca. 0.8 mm or less.

The length of the spring element 150 is preferably ca. 4 mm or more, and in particular ca. 6 mm or more.

In particular, the length of the spring element 150 is ca. 20 mm or less, and in particular ca. 18 mm or less.

Preferably, a ratio of a minimum width of the spring element 150 perpendicular to the opening direction 144 to the average material thickness of the spring element 150 is ca. 2:1 or more, and in particular ca. 5:1 or more—for example, ca. 10:1 or more.

Preferably, the ratio of the minimum width of the spring element 150 perpendicular to the opening direction 144 to the average material thickness of the spring element 150 is ca. 50:1 or less, and in particular ca. 45:1 or less—for example, ca. 40:1 or less.

For example, the minimum width of the spring element 150 is ca. 2 mm or more, and in particular ca. 4 mm or more.

For example, the minimum width of the spring element 150 is ca. 10 mm or less, and in particular ca. 8 mm or less.

The minimum width of the spring element 150 is preferably a distance between two retaining elements 170 in a direction extending perpendicular to the opening direction 144.

For example, the minimum width of the spring element 150 can be a minimum diameter of the spring element 150.

For receiving the membrane 142, it can be advantageous if the sealing device 112 has a sealing ring 180 which is annular and/or has an opening for receiving the membrane 142.

On a side, facing the interior 106 of the pressure equalization apparatus 100, of the sealing ring 180, the sealing ring 180 in the present case has two thickened portions and/or projections which are arranged at least approximately concentrically with respect to one another and are of annular design.

In the present case, an annularly-extending groove is formed between the thickened portions and/or projections, which groove forms a recess for form-fitting and/or force-fitting and/or firmly-bonded reception of a fastening frame of the sealing element 152 of the sealing device 112.

The sealing element 152 serves in particular for sealing a connection between the sealing device 112 and the main element 110 in the closed state of the pressure equalization apparatus 100. Preferably, the sealing element 152 protects the interior 106 from water and/or dust.

Figure 6:
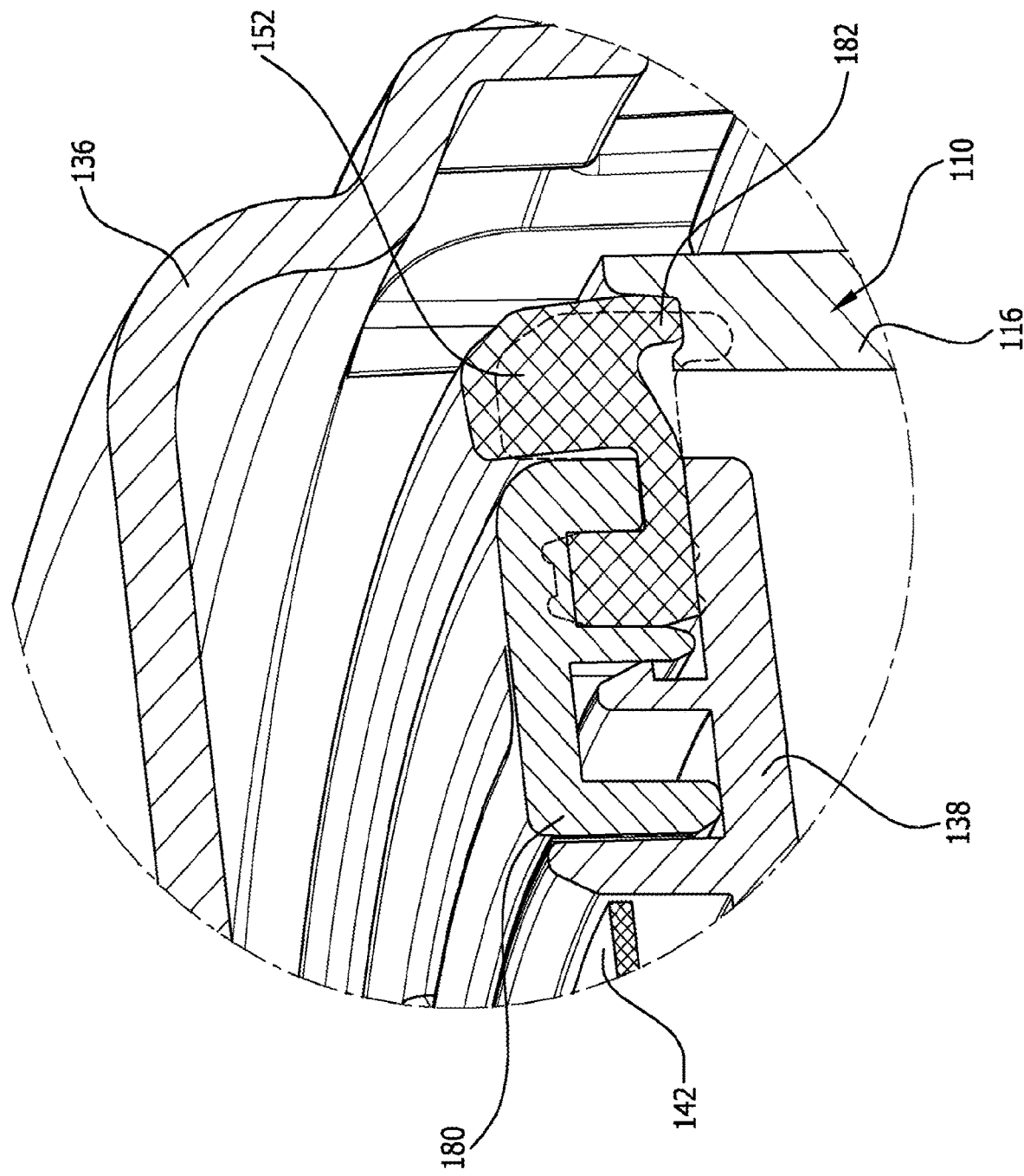
FIG. 6 an enlarged detail of the region designated VI in FIG. 5, in which a connection of a sealing device of the pressure equalization apparatus and of the main element of the pressure equalization apparatus can be seen.

As can be seen in particular in FIG. 6, the sealing element 152 preferably has at least one sealing lip 182 which, in the closed state of the pressure equalization apparatus 100, bears against the end, facing away from the interior 106, of the main element 110 and/or is pressed against it.

The at least one sealing lip 182 is preferably arranged on an underside, facing the interior 106, of the sealing element 152 and preferably extends away from a main body of the sealing element 152 in a direction facing the interior 106.

For example, the sealing element 152 can be designed as a molded seal and/or be fixed to the support plate 138 and/or the sealing ring 180 in a firmly-bonded manner—for example, by molding and/or vulcanization.

Preferably, the sealing ring 180 and the sealing element 152 engage in one another.

The membrane 142 is preferably permeable to air and/or impermeable to water.

In the present case, the membrane 142 is designed to be open-pored and/or comprises a polytetrafluoroethylene (PTFE) material or is formed therefrom. The open-pore design of the membrane 142 serves in particular for a respiration function of the pressure equalization apparatus 100.

Additionally or alternatively, it can be provided for an element having a breathing function to be arranged therebefore or thereafter in the opening direction 144 (not shown in the drawings).

Additionally or alternatively to the PTFE material, the membrane 142 in particular comprises a graphene material, e.g., graphene, or is formed of a graphene material—for example, graphene.

It can be provided that the membrane 142 comprise or be formed from a fleece material.

In particular, an opening pressure in the range of 30 mbar to 500 mbar can be set by the shape and average material thickness of the spring element 150.

Figure 9:
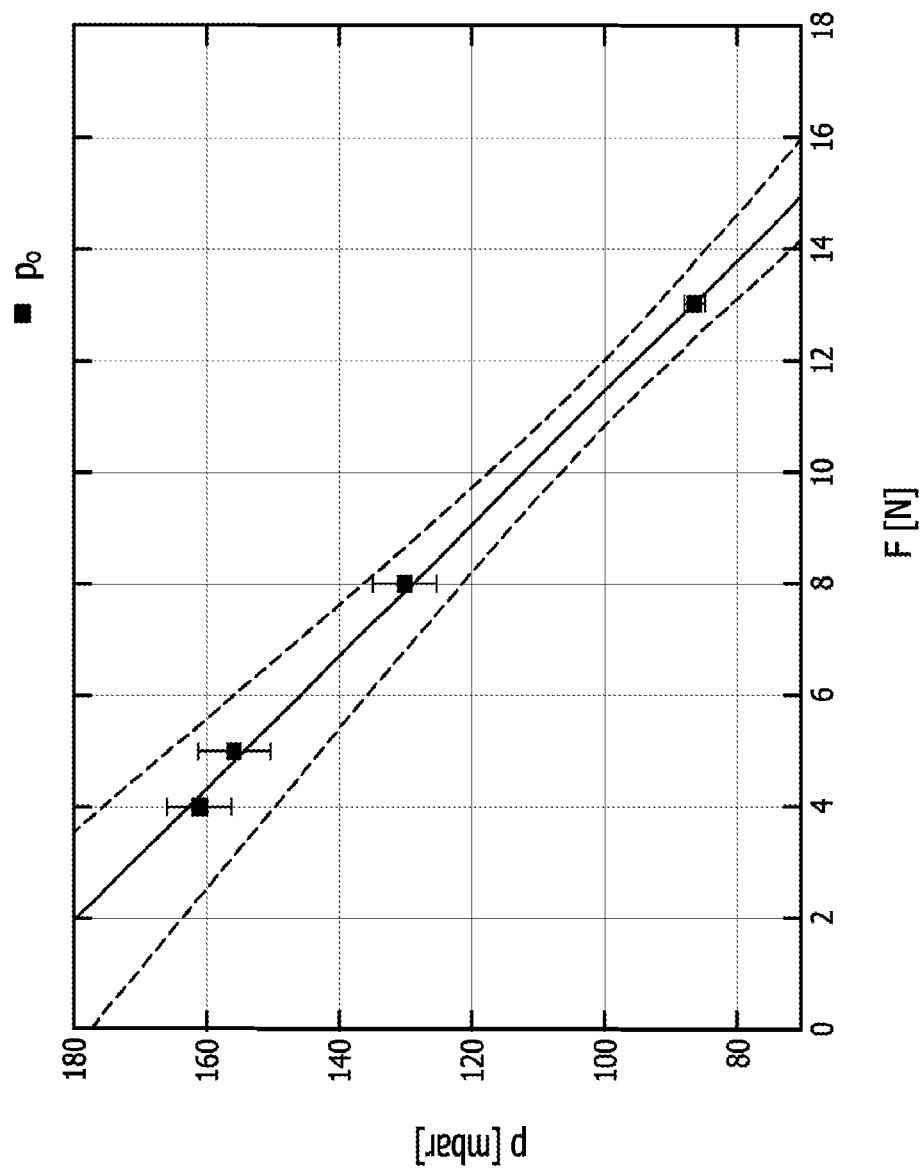
FIG. 9 a diagram in which an opening pressure of the pressure equalization apparatus is shown as a function of a spring force of the spring element of the connection device.

FIG. 9 is a diagram of the opening pressure $p_o$ as a function of the spring force F in N. The spring force F in N is plotted on the x-axis. The opening pressure p in mbar is plotted on the y-axis.

An at least approximately linear dependence of the opening pressure upon the spring force can be seen.

In particular, an emergency degassing of the electrochemical system 104 can be carried out with the pressure equalization apparatus 100, wherein an opening pressure is adjustable due to the design and spring force of the spring element 150.

Preferably, a fine adjustment of the opening pressure up to ±60 mbar is possible.

An alternative embodiment of a sealing device 112 shown in FIGS. 11 through 15 differs from the embodiment shown in FIGS. 1 through 9 essentially in that the sealing device 112 is produced in a multi-stage injection molding process, and in particular a 2K injection molding process.

In this case, the support plate 138, the sealing element 152—in particular, the sealing lip 182—and a sealing ring 180, for receiving the membrane 142, are preferably produced from plastic by two-stage or more than two-stage injection molding.

In particular, it can be provided that the support plate 138 be produced by injection molding in a die, and that the sealing element 152—in particular, the sealing lip 182—and the sealing ring 180, for receiving the membrane 142, then be injected onto the support plate 138.

The membrane 142 can, however, be subsequently introduced or inserted into the die and overmolded. Preferably, the sealing ring 180 is produced by overmolding the membrane 142.

The support plate 138 preferably comprises several receiving regions 184 which are formed as recesses on an upper side, facing away from the holding element 140, of the support plate 138 and which serve to receive crosspieces 186.

The crosspieces 186 connect the sealing element 152 to the sealing ring 180 for receiving the membrane 142.

The sealing element 152, the sealing ring 180, and the crosspieces 186 are thus in particular formed in one piece as a coherent component, and preferably injected onto the support plate 138 in an injection molding step.

Otherwise, the embodiment of the sealing device 112 shown in FIGS. 11 through 15 corresponds, in terms of structure and function, to the embodiment shown in FIGS. 1 through 9, such that reference is made, in this respect, to the above description thereof.

An embodiment of a sealing device 112 shown in FIGS. 16 through 20 differs from the embodiment shown in FIGS. 11 through 16 essentially in that only the sealing element 152—in particular, the sealing lip 182—and a sealing ring 180, for fixing the sealing element 152, are injected onto the support plate 138.

Crosspieces or a sealing ring for receiving the membrane are not provided. Instead, another fixation of the membrane, e.g., by latching, clamping, gluing, and/or welding, directly on the support plate 138 is provided.

This sealing device 112, also, is produced in a multi-stage injection molding process, and in particular a 2K injection molding process.

Otherwise, the embodiment of the sealing device 112 shown in FIGS. 16 through 20 corresponds, in terms of structure and function, to the embodiment shown in FIGS. 11 through 16, such that reference is made, in this respect, to the above description thereof.

The invention claimed is:

1. Pressure equalization apparatus comprising:
   a main element;
   a sealing device which, in a closed state of the pressure equalization apparatus, closes an interior of the pressure equalization apparatus; and
   a connection device for connecting the main element and the sealing device,
   wherein, in the closed state of the pressure equalization apparatus, the sealing device sealingly bears against the main element and is fixed relative to the main element by means of the connection device, and wherein a fixing connection between the main element and the sealing device is releasable for unblocking a fluid connection between the interior of the pressure equalization apparatus and surroundings of the pressure equalization apparatus, and wherein the connection device comprises a spring element, a spring force of which acts in a direction extending crosswise to an opening direction of the pressure equalization apparatus,
   wherein the spring element comprises one or more retaining elements,
   wherein the spring element is at least approximately U-shaped in a cross-section taken in parallel to the opening direction, and has two or more legs which extend away from a connection portion of the spring element along the opening direction, and wherein the one or more retaining elements are arranged on ends of the two or more legs, which ends face away from the interior of the pressure equalization apparatus.

2. Pressure equalization apparatus according to claim 1, wherein the spring element is
   a shaped spring and/or
   a leaf spring and/or
   wherein the one or more retaining elements are one or more inwardly-protruding latching projections.

3. Pressure equalization apparatus according to claim 1, wherein the sealing device comprises a support plate and a holding element adjoining said support plate, wherein the holding element extends away from the support plate, counter to the opening direction, and is held and/or surrounded by the spring element in the closed state of the pressure equalization apparatus.

4. Pressure equalization apparatus according to claim 1, wherein a ratio of a length of the spring element parallel to the opening direction to an average material thickness of the spring element is approximately 4:1 or more and/or approximately 100:1 or less.

5. Pressure equalization apparatus according to claim 1, wherein a ratio of a minimum width of the spring element perpendicular to the opening direction to an average material thickness of the spring element is approximately 2:1 or more and/or approximately 50:1 or less.

6. Pressure equalization apparatus according to claim 1, wherein the pressure equalization apparatus comprises a protective cover which covers at least part of the remaining components of the pressure equalization apparatus, wherein the remaining components of the pressure equalization apparatus include all components of the pressure equalization apparatus which are not components of the protective cover.

7. Pressure equalization apparatus according to claim 1, wherein the pressure equalization apparatus comprises a monitoring device, by means of which an opening process of the pressure equalization apparatus can be detected and/or by means of which it is possible to monitor whether the pressure equalization apparatus is in an open or in a closed state.

8. Electrochemical system comprising one or more pressure equalization apparatuses according to claim 1, wherein the one or more pressure equalization apparatuses are fixed to and/or in a wall of the electrochemical system.

9. Pressure equalization apparatus according to claim 1, wherein the sealing device comprises a support plate, a membrane, a sealing element, and/or a sealing ring.

10. Pressure equalization apparatus according to claim 9, wherein the support plate is produced together with the sealing ring for fixing the membrane and/or the sealing element, and/or together with the sealing element in a multi-stage injection molding process.

11. Pressure equalization apparatus according to claim 1, wherein the connection device comprises a receiving element which receives and/or holds the spring element.

12. Pressure equalization apparatus according to claim 11, wherein the receiving element has a sealing portion which, in the closed state of the pressure equalization apparatus, sealingly bears against the main element and/or wherein the receiving element has a counter retaining portion which engages behind the spring element, in the opening direction, in the closed state of the pressure equalization apparatus.

13. Pressure equalization apparatus according to claim 11, wherein the receiving element has several contact regions, which are in direct contact with the spring element and preferably receive and/or support the spring element on both sides.

14. Pressure equalization apparatus comprising:
a main element;
a sealing device which, in a closed state of the pressure equalization apparatus, closes an interior of the pressure equalization apparatus; and
a connection device for connecting the main element and the sealing device,
wherein, in the closed state of the pressure equalization apparatus, the sealing device sealingly bears against the main element and is fixed relative to the main element by means of the connection device, and wherein a fixing connection between the main element and the sealing device is releasable for unblocking a fluid connection between the interior of the pressure equalization apparatus and surroundings of the pressure equalization apparatus, and wherein the connection device comprises a spring element, a spring force of which acts in a direction extending crosswise to an opening direction of the pressure equalization apparatus,
wherein the connection device comprises a receiving element which receives and/or holds a connection portion of the spring element which connection portion faces the interior of the pressure equalization apparatus,
wherein the spring element is at least approximately U-shaped in a cross-section taken in parallel to the opening direction, and/or wherein the spring element has two or more legs which extend away from a connection portion of the spring element along the opening direction,
wherein one or more retaining elements are arranged on ends of the two or more legs which ends face away from an interior of the pressure equalization apparatus.

15. Pressure equalization apparatus according to claim 14, wherein one or more retaining elements of the spring element, in an open state of the pressure equalization apparatus, each form a stop with respect to a movement of the sealing device counter to the opening direction.

16. Pressure equalization apparatus comprising:
a main element;
a sealing device which, in a closed state of the pressure equalization apparatus, closes an interior of the pressure equalization apparatus; and
a connection device for connecting the main element and the sealing device,
wherein, in the closed state of the pressure equalization apparatus, the sealing device sealingly bears against the main element and is fixed relative to the main element by means of the connection device, and wherein a fixing connection between the main element and the sealing device is releasable for unblocking a fluid connection between the interior of the pressure equalization apparatus and surroundings of the pressure equalization apparatus, and wherein the connection device comprises a spring element, a spring force of which acts in a direction extending crosswise to an opening direction of the pressure equalization apparatus,
wherein the sealing device comprises a support plate and a holding element adjoining said plate, wherein the holding element extends away from the support plate counter to the opening direction and is held and/or surrounded by the spring element in the closed state of the pressure equalization apparatus.

17. Pressure equalization apparatus according to claim 16, wherein the spring element is at least approximately U-shaped in a cross-section taken in parallel to the opening direction, and/or wherein the spring element has two or more legs which extend away from a connection portion of the spring element along the opening direction.

18. Pressure equalization apparatus according to claim 17, wherein one or more retaining elements are arranged on ends of the two or more legs which ends face away from the interior of the pressure equalization apparatus.

* * * * *